US008285052B1

(12) United States Patent
Bhattacharyya et al.

(10) Patent No.: US 8,285,052 B1
(45) Date of Patent: Oct. 9, 2012

(54) IMAGE ORDERING SYSTEM OPTIMIZED VIA USER FEEDBACK

(75) Inventors: Rajan Bhattacharyya, Sherman Oaks, CA (US); Deepak Khosla, Camarillo, CA (US); David J. Huber, Calabasas, CA (US); Penn Tasinga, Rowland, CA (US)

(73) Assignee: HRL Laboratories, LLC, Malibu, CA (US)

( * ) Notice: Subject to any disclaimer, the term of this patent is extended or adjusted under 35 U.S.C. 154(b) by 426 days.

(21) Appl. No.: 12/653,561

(22) Filed: Dec. 15, 2009

(51) Int. Cl.
*G06K 9/46* (2006.01)
*G06K 9/68* (2006.01)
(52) U.S. Cl. ......... 382/190; 382/218; 382/219; 382/220
(58) Field of Classification Search ................. 382/190, 382/218–220
See application file for complete search history.

(56) References Cited

U.S. PATENT DOCUMENTS

| 6,670,963 | B2 | 12/2003 | Osberger |
| 7,103,225 | B2* | 9/2006 | Yang et al. ............ 382/225 |
| 7,756,309 | B2* | 7/2010 | Gholap et al. ............ 382/128 |
| 2003/0123737 | A1* | 7/2003 | Mojsilovic et al. ......... 382/224 |
| 2005/0047647 | A1 | 3/2005 | Rutishauser et al. |
| 2007/0173699 | A1 | 7/2007 | Mathan et al. |
| 2007/0236488 | A1 | 10/2007 | Mathan et al. |
| 2008/0056611 | A1 | 3/2008 | Mathan et al. |
| 2008/0317386 | A1* | 12/2008 | Wood et al. ............ 382/307 |
| 2010/0128919 | A1* | 5/2010 | Perronnin et al. ............ 382/100 |
| 2010/0202707 | A1* | 8/2010 | Costache et al. ............ 382/224 |
| 2011/0074966 | A1* | 3/2011 | Cerosaletti et al. ......... 348/222.1 |

FOREIGN PATENT DOCUMENTS
WO WO 03/093947 11/2003

OTHER PUBLICATIONS

Andoni A., et al., "Near-Optimal Hashing Algorithms for Near Neighbor Problem in High Dimensions," Proceedings of the Symposium on Foundations of Computer Science (FOCS'06), 2006.
Bentin, S., et al., "Electrophysiological studies of face perception in humans," Journal of Cognitive Neuroscience, 8, 551-565, 1996.
Berg A., "Shape matching and object recognition," Ph.D. thesis, UC Berkeley, Computer Science Division, Berkeley, CA, Dec. 2005.

(Continued)

*Primary Examiner* — Bhavesh Mehta
*Assistant Examiner* — Utpal Shah
(74) *Attorney, Agent, or Firm* — Tope-McKay & Assoc.

(57) ABSTRACT

Described is a system for ordering images. The system receives a plurality of images. Image features are extracted from each image. A set of all possible image pairs are generated for all images. A similarity metric with weights is generated between the images in each image pair in the set, with a net similarity metric thereafter generated by combining the similarity metrics. The images are then ordered according to the net similarity metrics to generate a computer-ordered set of images. The computer-ordered set of images is then displayed to the user, which allows the user to re-order the images to generate a user-ordered set of images. The weights are then optimized to minimize the distance between the computer-ordered set of images and the user-ordered set of images. The similarity metrics are then re-weighted, with the images thereafter being re-ordered according to the new metrics.

23 Claims, 17 Drawing Sheets
(13 of 17 Drawing Sheet(s) Filed in Color)

OTHER PUBLICATIONS

Berka, C., et al., "Evaluation of an EEG-workload model in an aegis simulation environment" in Proceedings of SPIE Defense and Security Symposium, 90-99, 2005.

Bhattacharyya, R., et al., "Optimal image ordering for rapid serial visual presentation using electroencephalography," Presented at Society of NeuroScience (SfN) annual meeting, Chicago, 2009.

Carpenter G.A., et al., "A massively parallel architecture for a self-organizing neural pattern recognition machine," Computer Vision, Graphics, and Image Processing, 37, 54-115, 1987.

Carpenter G.A., et al., "The what-and-where filter a spatial mapping neural network for object recognition and image understanding," Computer Vision and Image Understanding, 69, 1-22, 1998.

Carpenter G.A., "Default ARTMAP," in Proc. of the International Joint Conference on Neural Networks (IJCNN'03), 1396-1401, 2003.

Carpenter G.A., et al., "Self-organizing information fusion and hierarchical knowledge discovery: a new framework using ARTMAP neural networks," Neural Networks, 18, 287-295, 2005.

Cowell, et al., "Construction and validation of neurophysio-technological framework for imagery analysis," in J.Jacke (Ed.): Human-Computer Interaction, Part II, HCII 2007, LNCS 4551, pp. 1096-1105, 2007, © Springer-Verlag Berlin Heidelberg.

Draper B., et al., "Evaluation of Selective Attention under Similarity Transforms," in Workshop on Performance and Attention in Computer Vision. Graz, Austria, Apr. 2003.

Eckhorn R., et al., "Coherent Oscillations: A Mechanism of feature linking in the visual cortex?" Biological Cybernetics 60, 121-130, 1988.

Eimer, M., "Does the face-specific N170 component reflect the activity of a specialized eye processor?" Neuroreport, 9, 2945-2948, 1998.

Fabre-Thorpe, M., et al., "A limit to the speed of processing in Ultra-Rapid visual categorization of novel natural scenes," Journal of Cognitive Neuroscience, 13, 171-180, 2001.

Field D.J., "Relations between the statistics of natural images and the response properties of cortical cells," J. Opt. Soc. Am. A., 4: 2379-2394, 1987.

Fei-Fei L., et al., "Learning generative visual models from few training examples: an incremental Bayesian approach tested on 101 object categories," CVPR 2004, Workshop on Generative-Model Based Vision, 2004.

Richard P. Wildes, "A measure of motion salience for surveillance applications" in Proc. IEEE Int'l Conf. Image Processing, 1998.

Gladwell, M., "Blink: the power of thinking without thinking," 1st ed. Little, brown and company: Time Warner Book Group, New York, 2005, pp. 18-47.

Zang H., et al., "SVM-KNN: Discriminative nearest neighbor classification for visual category recognition," CVPR 2006.26. Vazirani, V., "Approximation algorithms," Springer-Verlag, Berlin, Germany, p. 32, 2004.

Gray C.M., et al., "Oscillatory Responses in Cat visual cortex exhibit intercolumnar synchronization which reflects global stimulus properties," Nature 338: 334-336, 1989.

Hopf, J.-M., et al., "Localizing visual discrimination processes in time and space," The American Physiological Society, 88, 2088-2095, 2002.

Itti L., et al., "A saliency-based search mechanism for overt and covert shifts of visual attention," Vision Research, 40: 1489-1506, 2000.

Itti L., et al., "A Model of Saliency-Based Visual Attention for Rapid Scene Analysis," IEEE Transactions on Pattern Analysis and Machine Intelligence, 20, 1254-1259, 1998.

Itti L., et al., "Bayesian Surprise Attracts Human Attention," Vision Research 49: 1295-1306, 2008.

Itti, L., et al., "Computational Modeling of Visual Attention," Nature Reviews Neuroscience, 2, 194-203, 2001.

Itti, L., "Quantifying the Contribution of low-level saliency to human eye movements in dynamic scenes," Visual Cognition, 12, 1093-1123, 2005.

Keysers, C., et al., "The Speed of Sight," Journal of Cognitive Neuroscience, 13 (1), 90-101, 2001.

Khosla D., et al., "Bio-Inspired Visual Attention and Object Recognition," In: Proc. SPIE Defense, Security, and Sensing, 6560, 656003, 2007.

Khosla, D., et al., "A bio-inspired system for spatio-temporal recognition in static and video imagery," Proc. SPIE 6560, 656002, 2007.

Koch C., et al., "Shifts in selective visual attention: towards the underlying neural circuitry," Human Neurobiology, 4: 219-227, 1985.

Lazebnik S., et al., "Beyond Bags of Features: spatial pyramid matching for recognizing natural scene categories," In: Proc. IEEE Conference on Computer Vision and Pattern Recognition (CVPR), 2006.

Yamaguchi, S., et al., "Cerebral Asymmetry of the 'Top-down' allocation of attention to global and local features," The Journal of Neuroscience, 20, 1-5, 2000.

Medasani, S., et al., "Possibilistic particle swarms for optimization," Proceedings 5673 of SPIE/IST Symposium on Electronic Imaging, 2005.

Medasani, S., et al., "Active learning system for object fingerprinting," International Joint Conference on Neural Networks, 2004.

Vogel, E.K., et al., "The Visual NI Component as an index of a discrimination process," Psychophysiology, 2000.

Nane S.A., et al., "Columbia Object Image Library (COIL-100)," Technical Report CUCS-006-96, Feb. 1996.

Navalpakkam V., et al., Modeling the Influence of Task on Attention. Vision Research, 45: 205-231, 2005.

Navalpakkam V., et al., "An integrated model of top-down and bottom-up attention for optimal object detection," In: Proc. IEEE Conference on Computer Vision and Pattern Recognition (CVPR), 1-7, 2006.

Navalpakkam V., et al., "Sharing resources: buy attention, get recognition," In: Proc. International Workshop on Attention and Performance in Computer Vision (WAPCV'03), Graz, Austria, Jul. 2003.

Navalpakkam, V, et al., "Search goal tunes visual features optimally," Neuron, 53, 605-617, 2007.

Niebur E., at al., "Control of selective visual attention: modeling the 'where' pathway," in D. Touretzky, M Mozer and M. Hasselmo. Neural Imformation Processing Systems (NIPS 8), 802-808, Cambridge, MA, MIT, Press 1996.

Orabona F., et al., "Object-based Visual Attention: A Model for a Behaving Robot," in 3rd International Workshop on Attention and Performance in Computational Vision (in CVPR 2005), San Diego, CA, Jun. 2005.

Owechko, Y., et al., "A swarm-based volition/attention framework for object recognition," IEEE Conference on Computer Vision and Pattern Recognition, San Diego, 2005.

Owechko, Y., et al., "Cognitive swarms for rapid detection of objects and associations in visual imagery," IEEE Swarm Intelligence Symposium, 2005.

Peters, R.J., et al, "Beyond bottom-up: Incorporating task-dependent influences into computational model of spatial attention," in: Proc. IEEE Conference on Computer Vision and Pattern Recognition (CVPR), 2007.

Walther D., et al, "Attentional selection for object recognition—a gentle way," Lecture Notes in Computer Science 2525: 472-479, 2002.

Scholl B.J., "Objects and Attention: the state of the art," Cognition 80, 1-46, 2001.

Serre T., et al., "Object recognition with features inspired by visual cortex," in Proceedings of the IEEE conference on computer vision and pattern recognition (CVPR), San Diego, CA, Jun. 2005.

Wolfe J.M., "Visual Search in continuous, naturalistic stimuli," Vision Research 34: 1187-1195, 1994.

Sun Y., et al., "Hierarchical selectivity for object-based visual attention," Submitted to Artificial Intelligence, 2004.

Sun, Y., et al., "Probabilistic judgment by a coarser scale: behavioral and ERP evidence," in Proceedings of the Twenty-sixth Annual meeting of the Cognitive Science Society, 2004.

University of California, San Diego Complex Systems and Cognition Laboratory, CSCLAB Image Database http://csclab.ucsd.edu/labeledimages.php. 2006.

Gerson, A.D.; Parra, L.C.; and Sajda, P., "Cortically Coupled Computer Vision for Rapid Image Search," IEEE Transactions on Neural Systems and Rehabilitation Engineering, 14(2): 174-179, (2006).

Gutin, G.; Yeo, A.; and Zverovich, A., "Traveling Salesman Should Not be Greedy: Domination Analysis of Greedy-Type Heuristics for the TSP," Discrete Applied Mathematics. 117: 81-86 (2002).

Ling, H. and Okada, K., "Diffusion Distance for Histogram Comparison," IEEE Computer Society Conference on Computer Vision and Pattern Recognition (CVPR) (2006).

Morrison, D., Marchand-Maillet, S., & Bruno, E., "Semantic Clustering of Images Using Patterns of Relevance Feedback," in Proceedings of the 6th International Workshop on Content-based Multimedia Indexing (CBMI 2008), London, UK (2008).

Rogowitz, B.E.; Frese, T.; Smith, J.; Bouman, C.A.; and Kalin E., "Perceptual Image Similarity Experiments," Proceedings of SPIE, 3299: 576-590 (1998).

Smeulders, A.; Worring, M.; Santini, S.; Gupta, A.; and Jain, R., "Content-Based Image Retrieval at the End of the Early Years," IEEE Transactions on PAMI. 22(12): 1349-1380 (2000).

S. Thorpe, D. Fize, C. Marlot, "Speed of processing in the human visual system," Nature, vol. 381, pp. 520-522 (1996).

Vazirani, V., "Approximation Algorithms," Springer-Verlag, Berlin, Germany. pp. 32-33 (2004).

http://en.wikipedia.org/Travelling_salesman_problem, 2001.

* cited by examiner

IMAGE ORDERING SYSTEM OPTIMIZED VIA USER FEEDBACK

FIELD OF INVENTION

The present invention relates to an image ordering system and, more particularly, to a user-trained optimal image ordering system for rapid serial visual presentation to detect items of interest in images and video.

BACKGROUND OF INVENTION

The "Rapid Serial Visual Presentation" (RSVP) protocol has recently been discovered as a useful tool for high-throughput filtering of images into simple "target" and "non-target" categories. See S. Thorpe, D. Fize, and C. Marlot, in Speed of Processing in the Human Visual System. *Nature*, vol. 381, pp. 520-522 (1996). The RSVP protocol involves displaying small images (e.g., at 256-by-256 resolution), called "chips," to a human subject at a very high frame rate (e.g., 10 Hertz) and measuring the electrical activity of the subject's brain using electroencephalograph (EEG) technology.

When a target image is shown to the subject, even at these high speeds, the brain perceives the target chip as different from the others and registers a "surprise," which translates into a specific brainwave, dubbed as the "P300," which occurs at a specific, fixed time delay from the presentation of the image. A P300 is far more reliable than voluntary subject responses, such as a button press, which have varied delays. The chips that are perceived as nontargets are perceived as "boring" and do not elicit a P300. Therefore, the presence of a P300 signal is a valuable discriminator between what the subject considers a "surprising" versus "boring" chip.

The concept of "targets" vs. nontargets can be extended to "Items of Interest" (IOI) vs. non-interesting items, as described in U.S. patent application Ser. No. 12/316,779, filed on Dec. 16, 2008, entitled, "Cognitive-neural method for image analysis," which is incorporated by reference as though fully set forth herein. These items of interests are generally objects/groups of objects/spatial patterns in images and video and are of interest to the user (observer). Such items of interest are also usually application-specific. For example, an image analyst looking for a helipad in wide-area satellite imagery will consider the helipad to be the "target" or "item of interest." Likewise, a different image analyst looking for a convoy of moving vehicles in wide-area satellite imagery will consider such a spatio-temporal pattern to be the IOI for that application.

The P300 occurs prior to the activation of higher-level processes in the brain that identify and classify the target, but is not a "subliminal" process; the subject generally realizes that a target was viewed, but does so much slower than the brain produces a P300. The RSVP method captures the inherent efficiency of lower-level responses in the subject's brain.

Research has shown that even at these speeds, the human brain performs admirably well at differentiating between "target" and "nontarget" images, and is far more efficient than if the subject had manually inspected and sorted the chips. See Thorpe (1996); and Gerson, A. D., Parra, L. C., and Sajda, P., in Cortically Coupled Computer Vision for Rapid Image Search. *IEEE Transactions on Neural Systems and Rehabilitation Engineering*, 14(2): 174-179 (2006). RSVP has been used in a variety of applications, particularly those in which the subject is instructed to find targets in a sparse environment; for example, the subject might be instructed to look for buildings in satellite imagery over a desert.

As one might expect, measuring an involuntary response from a human brain poses difficulties that must be addressed. In particular, the RSVP paradigm does not allow the subject to classify chips specifically into "target" and "nontarget" bins. Rather, the chips are actually sorted into "surprising" and "boring" bins based on the presence of the P300 signal. While the typical experimental procedure for an RSVP session involves randomizing the chips, if the sequence contains a series of high contrast chips or chips whose features are very different, an experiment can invoke a false P300 signal from nontarget images based on "jarring" the visual field between dissimilar images. For example, a ground-based image might contain sky, background, foreground, and middle ground, each of which exhibit dramatically different colors, lighting, scales, and textures. A chip sequence consisting of a number of foreground images followed by a single sky image could easily produce a P300 based on the surprise of rapidly shifting from one set of image features to another in succession. This false signal masks the surprise produced by actual targets and increases the rate of false alarm.

In practice, using RSVP to analyze ground-based images presents a number of hazards that can cause the subject to exhibit a P300 neural signal without viewing a target. As noted above, the P300 signal occurs as the result of "surprise", which can be the result of seeing a target in an image, but also can occur from the rapid exposure to images that have a high contrast to one another, such as an image of the dark ground followed by an image of the bright sky. A way to reduce such "jarring" could be by placing similar images next to one another.

Current methods exist to sequence images according to their similarity. These algorithms create generally smooth sequences that contain a handful of bad transitions that can derail an RSVP experiment, which requires precision in the image ordering. For example, the problem of computing a sequence of images whose distances from one another are minimized is an analog to the "travelling salesman" problem. See wikipedia.org/Travelling_salesman_problem. The travelling salesman problem is computationally intractable and cannot be solved absolutely without testing every possible image sequence, which is a complex and time-consuming process.

Another solution to the "jarring" problem is in the field of content-based image retrieval (CBIR). See Smeulders, A., Worring, M., Santini, S., Gupta, A., and Jain, R., Content-Based Image Retrieval at the End of the Early Years. *IEEE Transactions on PAMI*. 22(12): 1349-1380 (2000). CBIR permits image searching based on features automatically extracted from the images themselves. This field has been motivated by the need to efficiently manage large image databases and run image retrievals without exhaustive searches of the image archive each time. The system compares the features of the selected image with the characteristics of the other images in the set and returns the most similar images. Typically, this is done by computing, for each image, a vector containing the values of a number of attributes and computing the distance between image feature vectors. Many different features and combinations have been used in CBIR systems. Color retrieval yields the best results, in that the computer results of color similarity are similar to those derived by a human visual system. See Rogowitz, B. E., Frese, T., Smith, J., Bouman, C. A., and Kalin, E., Perceptual Image Similarity Experiments. *Proceedings of SPIE*, 3299: 576-590 (1998). Other features include texture, shape, bio-inspired features, et cetera. The best image matches are typically returned and displayed to the user in descending order of this computed distance.

While CBIR could be naively applied to image ordering using RSVP, this would pose a number of difficulties. For a block of images to be ordered for RSVP, one could determine the feature set of each and load them into the CBIR database. Starting from an arbitrary image, one could find the closest match, then the closest match to that image (the match), and so on, until all images have been queued. This procedure is equivalent to using the "nearest neighbor" heuristic for solving the travelling salesman problem. However, this algorithm does not guarantee the optimal result, and can actually provide the least optimal result depending on the dataset and the first image selected. See Gutin, G., Yeo, A., and Zverovich, A., Traveling Salesman Should Not be Greedy: Domination Analysis of Greedy-Type Heuristics for the TSP. *Discrete Applied Mathematics.* 117: 81-86 (2002).

The prior art for user relevance feedback (i.e., supervised learning) in CBIR systems primarily focuses on whether the images returned by the algorithm are similar to a seed image. See Morrison, D., Marchand-Maillet, S., and Bruno, E., Semantic Clustering of Images Using Patterns of Relevance Feedback. in *Proceedings of the 6th International Workshop on Content-based Multimedia Indexing* (*CBMI* 2008), London, UK (2008). This involves running the computer algorithm to find a candidate match for an image, and then allowing the user to answer as affirmative or negative regarding the similarity of the image. This deviates sharply from the present invention because it does not address the issue of image sequencing or determining the relative similarity of images that may, in fact, be very similar to one another. The CBIR prior art has no notion of ordering of the images as in the present invention.

Each of the methods of the prior art as discussed above exhibit limitations that make them incomplete. For example, the prior art does not directly address the problem of ordering images specifically for the RSVP paradigm and, as such, produce results that are unacceptable for the application.

Further, simple metrics for determining image distance fail to sequence the images properly (according to human perception) based solely on distance. While an image distance metric can objectively order images according to some mathematical formula, the application to RSVP for an EEG study requires that the images be presented in a perceptibly smooth manner. Often, the optimal sequence from an objectively determined distance metric will still contain image sequences that exhibit a jarring effect, again, providing an unacceptable result.

Thus, a continuing need exists for an image ordering system that employs subjective feedback from a human viewer for rapid serial visual presentation to detect items of interest in images and video.

SUMMARY OF INVENTION

The present invention relates improves upon the prior art by providing a method for optimizing image ordering via user feedback. The method is computer-implemented, using a processor to perform several operations. For example, the processor initially receives a first set of a plurality of images that need to be ordered. Image features are then extracted from each image. A set of all possible image pairs for all images are then generated. Thereafter, at least one similarity metric is generated between the images in each image pair in the set. If more than one similarity metric exists between the images in each image pair in the set, then a net similarity metric is generated by combining the similarity metrics. Alternatively, if only one similarity metric exists between the images in each image pair in the set, then a net similarity metric is the similarity metric. The plurality of images that need to be ordered are then ordered according to the net similarity metrics to generate a computer-ordered set of images, which is displayed to a user.

In generating at least one similarity metric, the similarity metric is a perceptual similarity metric selected from a group consisting of a gradient from an HSV feature space and a diffusion distance between histograms of HSV feature space.

Additionally, the act of generating a net similarity metric further comprises acts of weighting the perceptual similarity metrics according to predetermined weights to generate weighted perceptual similarity metrics; and summing the weighted perceptual similarity metrics into the net similarity metric.

In yet another aspect, the present invention further comprises an act of receiving user input to the computer-ordered set of images to generate a user-ordered set of images. The weights are then optimized to generate optimized weights such that the distance between the computer-ordered set of images and the user-ordered set of images is minimized.

As noted above, the present invention utilizes user feedback to optimize the image order. In doing so, the perceptual similarity metrics are weighted according to the optimized weights to generate re-weighted perceptual similarity metrics. The re-weighted perceptual similarity metrics are then summed into a new net similarity metric. The plurality of images are then ordered (or re-ordered) according to the new net similarity metrics to generate a computer-ordered set of images. The computer-ordered set of images is then displayed to a user, allowing the user to provide input to the computer-ordered set of images to generate a user-ordered set of images. The weights are then optimized to generate optimized weights such that the distance between the computer-ordered set of images and the user-ordered set of images is minimized. The process is then repeated until the distance is less than a predetermined threshold or receipt of an optimized ordering as indicated by a user.

The present invention can also be applied to multiple sets of images. For example, a second plurality of images (that need to be ordered) can be received by the processor. The process described above with the first group of images (i.e., the plurality of images) can be applied to a second group of images (i.e., the second plurality of images), where after applying said process, the second plurality of images that need to be ordered are ordered according to the net similarity metrics to generate a computer-ordered set of images (which again are displayed to the user).

In ordering the plurality of images according to the net similarity metrics, the images are ordered such that images that are most similar are ordered next to one another or, alternatively, the images are ordered such that images that are most dissimilar are ordered next to one another.

Finally, the present invention also includes a system and computer program product. The system comprises a processor that is configured to perform the operations described herein, while the computer program product comprises computer-readable instruction means for causing the processor to perform such operations.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where.

DETAILED DESCRIPTION

Figure 1:
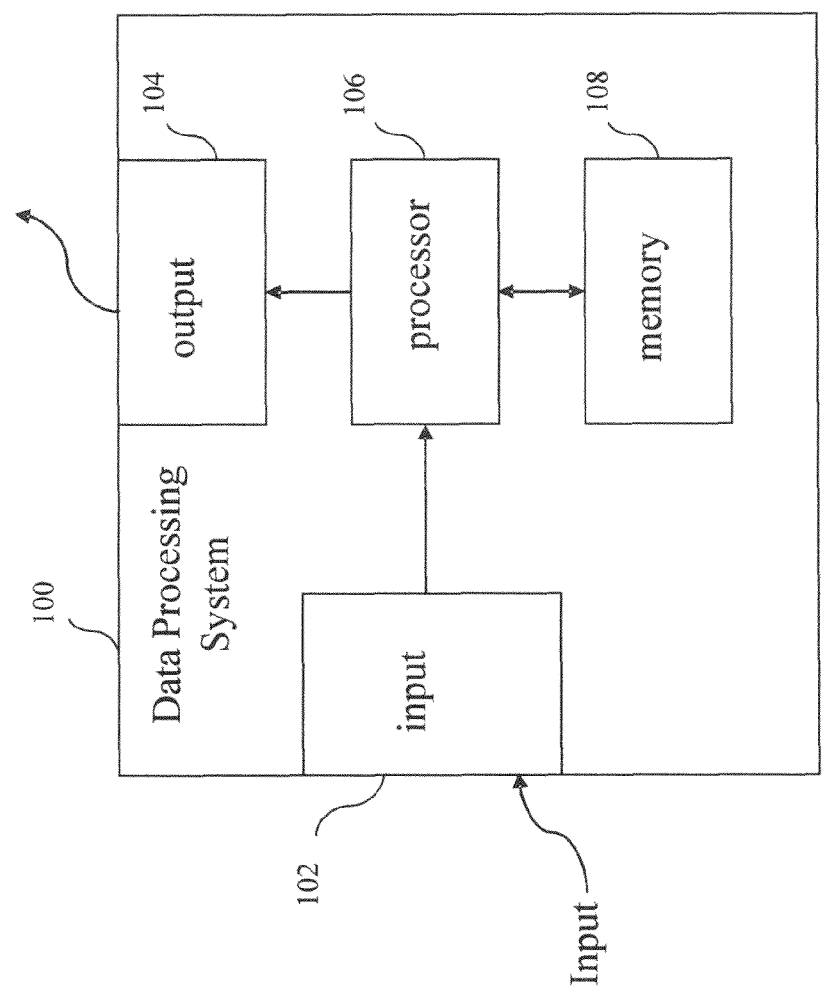
FIG. 1 is a block diagram depicting the components of an image ordering system of the present invention.

The present invention relates to an image ordering system and, more particularly, to a user-trained optimal image ordering system for rapid serial visual presentation to detect items of interest in images and video. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first, a description of various principal aspects of the present invention is provided. Subsequently, an introduction provides the reader with a general understanding of the present invention. Thereafter, details of the present invention are provided to give an understanding of the specific aspects. Finally, an example application is described to provide the reader with a concrete example of the present invention as reduced to practice.

(1) PRINCIPAL ASPECTS

The present invention has three "principal" aspects. The first is an image ordering system. The image ordering system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of an image ordering system of the present invention is provided in FIG. 1. The image ordering system 100 comprises an input 102 for receiving information for ordering an image. Note that the input 102 may include multiple "ports." Typically, input is received as images and user training or re-ordering of the images. An output 104 is connected with the processor for providing the images to a user or other systems. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
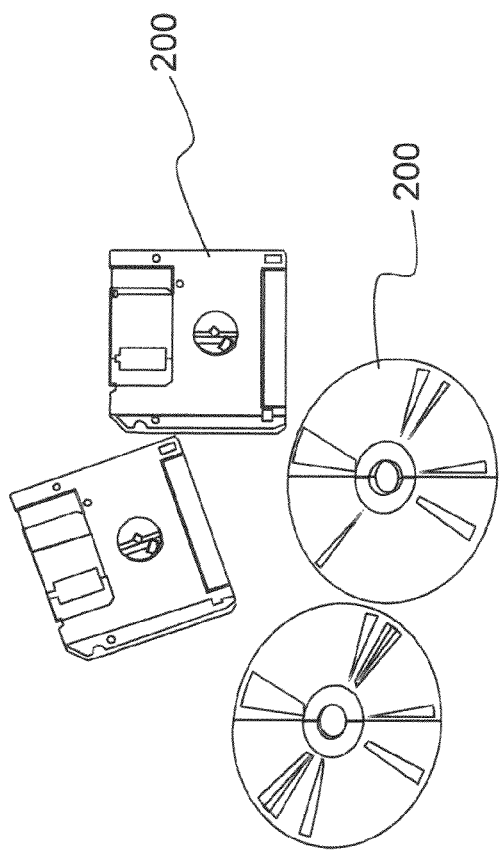
FIG. 2 is an illustration of a computer program product according to the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instruction means stored on any compatible computer-readable medium. The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

(2) INTRODUCTION

The present invention describes a system for ordering image subsets (called "chips") into sequences that maximize the likelihood of true "target" detection while simultaneously minimizing the likelihood of false alarms and unintended subject response.

The system is novel in that it employs (and depends on) a sequence of steps and a unique user-interaction step to determine and learn the optimal ordering of image sequences. The invention uses user feedback to learn the optimal balance of image distance metrics in order to closely emulate the human's own preference for image order. It then employs the fusion of various image metrics to emulate the human's sequencing ability for groups of image chips, which are subsequently used in RSVP trials.

The present invention accomplishes this by combining various perceptual and bio-inspired image features and its similarity metrics in order to create a sequence that minimizes this image jarring effect to the viewer. The user is asked to re-sequence the images based on subjective perception. The system considers this order and adjusts the weighting parameters among the different image distance (similarity) metrics. A new sequence is presented to the user, and the cycle continues, until the system is able to accurately emulate the sequencing ability of the subject. Thus, the present invention combines image distance metrics and automated sequencing with user feedback to order image chips such that the occurrence of false P300 signals due to image "jarring" is minimized. The system minimizes this "jarring" effect by placing similar images next to one another in the RSVP queue, eliminating the effect of image jarring. This can be readily extended to multiple image sets and multiple users as well.

The present invention is useful for any application that employs the RSVP paradigm for rapid object classification. For example, it can be employed in human-assisted threat assessment and threat queuing applications in which the system must scan a wide field of view and report any anomalies to the landscape. In these instances, automated classification methods might fail. Other examples of potential applications include automotive safety, factory safety and efficiency (e.g., sorting tasks), intelligence analysis, surveillance, et cetera.

(3) DETAILS OF THE INVENTION

Figure 3:
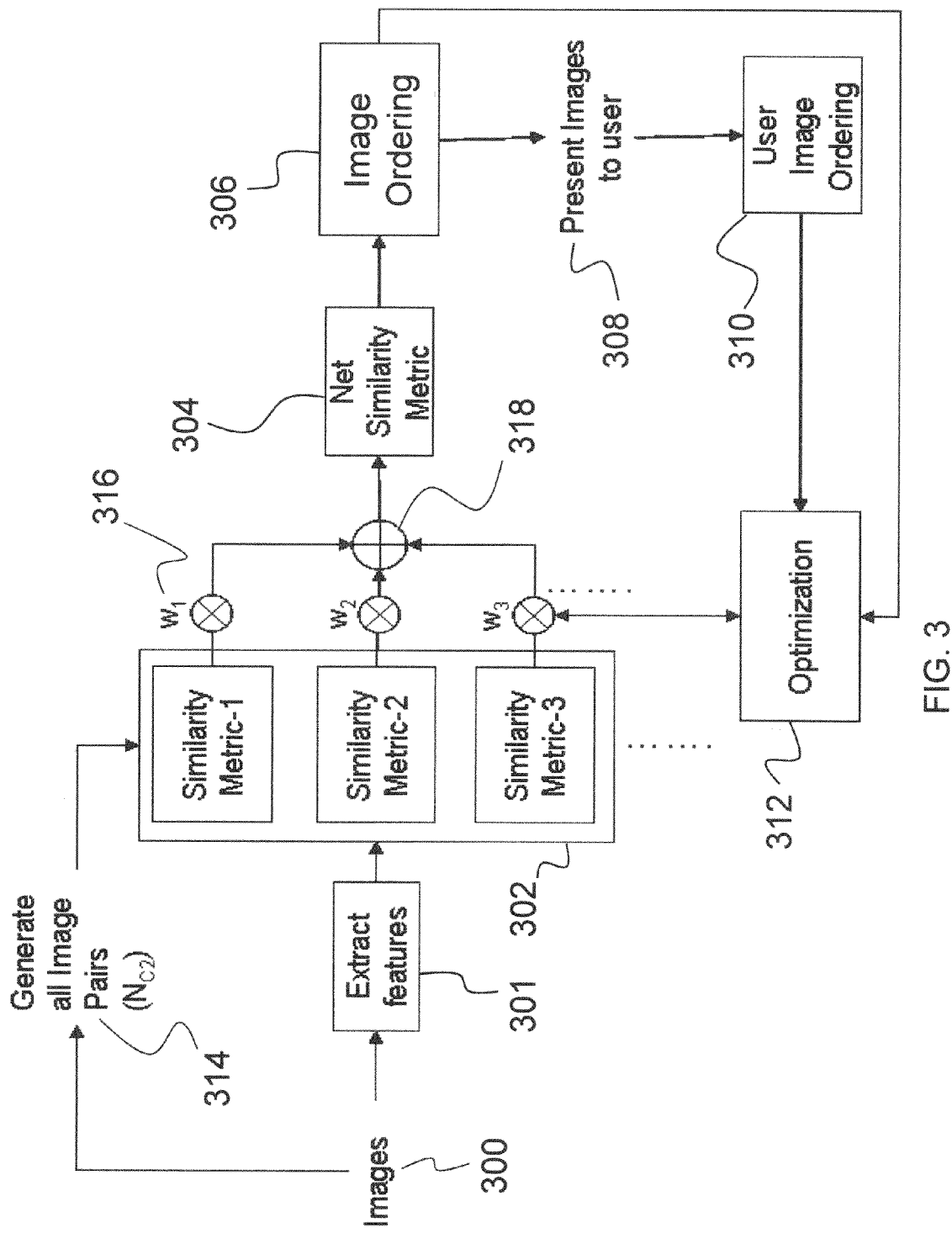
FIG. 3 is a flowchart of the process for image ordering according to the present invention.

As noted above, the present invention describes a system for ordering image subsets (called "chips") into sequences that maximize the likelihood of true "target" detection. As shown in FIG. 3, after receiving a plurality of images 300 that need reordering, the system first extracts image features 301 from each image. Next, similarity metrics 302 are computed over all image pairs and combined (via weighted combination or any other combination technique) into a metric of net similarity 304. The system then arranges 306 the images in the order that it believes to be optimal (i.e., computer-ordered set of images) and presents 308 this sequence to the user (via a display, etc.); the user rearranges 310 this sequence into the perceptibly correct order (i.e., user-ordered set of images). The system optimizes 312 the weights and repeats the process until the system is able to closely emulate the perceptive preference of the human subject.

Thus, the system generally includes five stages, which are to (1) extract image features, (2) compute the distance metrics, (3) sequence the images, (4) obtain user feedback, and then (5) optimize the algorithm to emulate the human subject's sequencing ability. Each stage of the system is described in more detail below.

(3.1) Extract Image Features

As an initial step in image ordering, image features must first be extracted (depicted as element 301 from FIG. 3) from the image set. Many different image features and combinations have been used in image similarity and search problems. Color retrieval usually yields the best results, in that the computer results of color similarity are similar to those derived by a human visual system. See Rogowitz, B. E., Frese, T., Smith, J., Bouman, C. A., and Kalin, E., Perceptual Image Similarity Experiments. *Proceedings of SPIE*, 3299: 576-590 (1998). Other features include texture, shape, edges, bio-inspired features, et cetera.

For color features, images are typically read as Red, Green and Blue (RGB) models and then transformed into the hue, saturation, and value (HSV) color model. The RGB color model is composed of the primary colors Red, Green, and Blue. They are considered the "additive primaries" since the colors are added together to produce the desired color. The Value represents intensity of a color, which is decoupled from the color information in the represented image. The HSV color model defines colors in terms of three constituent components; hue, saturation and value. The hue and saturation components are intimately related to the way human eye perceives color because they capture the whole spectrum of colors.

Based on prior art in the domain of color features for image similarity problems as well as experiments performed by the Applicants of the present application, the present invention uses a small group of local and global color features as the basis set of image features. These image features can be extended to include other types of image features just as easily. Thus, as can be appreciated by one skilled in the art, any extractable image feature can be used according to the present invention. However, because experiments indicated that the gradient of HSV gave better image ordering results, the gradient of HSV is used and described herein as a non-limiting example. As described further below, the gradient of HSV is used in the first metric (i.e., first image feature).

Thus, in this example, the image is first prepared by computing the HSV colors from RGB, i.e., $I_{RBG} \rightarrow I_{HSV}$. Such a computation is commonly understood by one skilled in the art. For example and as described by Wikipedia.org, the conversion from RGB to HSV or HSL (i.e., Hue, Saturation, and Lightness) can be computed as follows:

"Let r, g, b ∈ [0,1] be the red, green, and blue coordinates, respectively, of a color in RGB space. Let max be the greatest of r, g, and b, and min the least. To find the hue angle h ∈ [0, 360] for either HSL or HSV space, compute:

$$h = \begin{cases} 0, & \text{if max = min} \\ \left(60° \times \frac{g-b}{\max-\min} + 360°\right) \bmod 360°, & \text{if max = } r \\ 60° \times \frac{b-r}{\max-\min} + 120°, & \text{if max = } g \\ 60° \times \frac{r-g}{\max-\min} + 240°, & \text{if max = } b \end{cases}$$

To find saturation and lightness s, l ∈ [0,1] for HSL space, compute:

$$l = \frac{1}{2}(\max + \min)$$

$$s = \begin{cases} 0, & \text{if max = min} \\ \frac{\max-\min}{\max+\min} = \frac{\max-\min}{2l}, & \text{if } l \leq \frac{1}{2} \\ \frac{\max-\min}{2-(\max+\min)} = \frac{\max-\min}{2-2l}, & \text{if } l > \frac{1}{2} \end{cases}$$

The value of h is generally normalized to lie between 0 and 360°, and h=0 is used when max=min (that is, for grays) though the hue has no geometric meaning there, where the saturation s=0. Similarly, the choice of 0 as the value for s when l is equal to 0 or 1 is arbitrary. HSL and HSV have the same definition of hue, but the other components differ. The values for s and v of an HSV color are defined as follows:

$$s = \begin{cases} 0, & \text{if max = 0} \\ \frac{\max-\min}{\max} = 1 - \frac{\min}{\max}, & \text{otherwise} \end{cases}$$

$$v = \max$$

The range of HSV and HSL vectors is a cube in the cartesian coordinate system; but since hue is really a cyclic property, it is not so necessary or appropriate to unwrap it, with a cut at 0 (red), into a linear coordinate. Therefore, visualizations of these spaces usually involve hue circles; cylindrical and conical (bi-conical for HSL) depictions are most popular; spherical depictions and other color solids are also possible." See HSL and HSV, wikipedia.org/w/index.php?title=HSL_and_HSV&oldid=321950904 (last visited Nov. 5, 2009).

Once $I_{HSV}$ is computed, the Gradient $G(I_{HSV})$ is then computed as follows:

$$G(I_{HSV}) = \begin{bmatrix} \partial_x I_H & \partial_y I_H \\ \partial_x I_S & \partial_y I_S \\ \partial_x I_V & \partial_y I_V \end{bmatrix},$$

where $I_H$, $I_S$, $I_V$ represent the raw values for the hue saturation and value, images respectively and $\partial_x, \partial_y$ represent the gradient in the image along the x and y axis.

The second image features that are extracted are the image histograms for each of the H, S and V channels, denoted as $H(I_H)$, $H(I_S)$, and $H(I_V)$, respectively. Thereafter, each histogram is normalized to sum to 1. As commonly understood by one skilled in the art and as defined by Wikipedia.org, "An image histogram is type of histogram which acts as a graphical representation of the tonal distribution in a digital image. It plots the number of pixels for each tonal value. By looking at the histogram for a specific image a viewer will be able to judge the entire tonal distribution at a glance.

Image histograms are present on many modern digital cameras. Photographers can use them as an aid to show the distribution of tones captured, and whether image detail has been lost to blown-out highlights or blacked-out shadows.

The horizontal axis of the graph represents the tonal variations, while the vertical axis represents the number of pixels in that particular tone. The left side of the horizontal axis represents the black and dark areas, the middle represents medium grey and the right hand side represents light and pure white areas. The vertical axis represents the size of the area that is captured in each one of these zones." See Image histogram, wikipedia.org/w/index.php?title=Image_histogram&oldid=316246629 (last visited Nov. 5, 2009).

For example, a set of bins can first be created (e.g., 256 bins, 0-255). The pixel values in the image can then be examined with the bins being used to create a tally of how many pixels have what value, etc. (which are thereafter normalized to 1 as described above).

The extracted image features (i.e., the Gradient $G(I_{HSV})$ and image histograms), as described above, can then be used to determine the similarity metric between images.

(3.2) Similarity Metrics

In order to computer a similarity metric between the images, the system must first generate a set of all possible image pairs for all images (depicted as element 314 in FIG. 3). Thus, the similarity metric is generated between the images in each image pair in the set.

To compute the similarity metric between a pair of images $I_1$ and $I_2$, the image features from the first step are used to compute several "distance" metrics.

The "gradient" distance metric $K_G$ uses the L1 norm of the gradient difference between the images, as follows:

$$K_G = \Sigma |G(I_{1HSV}) - G(I_{2HSV})|.$$

Note that in the above equation, $I_1$ and $I_2$ represent images in HSV feature (i.e., color) space. The purpose of this operation is to capture local common structure in images $I_1$ and $I_2$. It should also be noted that $K_G$ is a scalar, just as $K_{HT}$ is in the equation provided below. $K_G$ is the sum of the absolute value of the term-by-term difference of the matrices $G(I_1)$ and $G(I_2)$.

The "histogram" distance metric $K_{HT}$ uses the L1-norm of the histogram difference between the images, as follows:

$$K_{HT} = \sum_{H,S,V} |H(I_1) - H(I_2)|$$

The histogram differences are used to allow the eventual summed distance measure to not be overly sensitive to noise in images. As noted above, $K_{HT}$ is a scalar. The vector difference is converted to scalar by the L1-norm, which is the sum of the absolute value of the difference vector.

Another image distance metric that can be used is the diffusion distance, a histogram distance measure as described by Ling, H. and Okada, K., in Diffusion Distance for Histogram Comparison. *IEEE Computer Society Conference on*

*Computer Vision and Pattern Recognition (CVPR)*(2006), which is incorporated by reference as though fully set forth herein.

For two histograms $h_1$ and $h_2$, the diffusion distance is computed as:

$$K(h_1, h_2) = \sum_{l=0}^{L} |d_l(x)|,$$

where $d_l$ are computed recursively as below:

$$d_0(x) = h_1(x) - h_2(x)$$

$$d_l(x) = [d_{l-1}(x) * \phi(x,\sigma)] \downarrow_2, \text{ and}$$

where $\phi(x,\sigma)$ is a Gaussian filter, with the tunable parameter $\sigma$ to describe how much each layer diffuses. The symbol $\downarrow_2$ represents the down sampling of the histograms and L is the number of layers of diffusion, as described by Ling (2006). Further, the asterisk * denotes a convolution operation of vector d(x) with a Gaussian filter vector (i.e., a smoothing step), while down sampling is a standard term known to someone skilled in the art. For example, it reduces a N×1 vector to a N/2×1 vector. It can also apply to matrix down sampling.

The "diffusion" distance metrics $K_H$, $K_S$, and $K_V$ are computed between the images for each image channel (H, S and V) histogram as:

$$K_H = K(H(I_{1,H}), H(I_{2,H}))$$

$$K_S = K(H(I_{1,S}), H(I_{2,S}))$$

$$K_V = K(H(I_{1,V}), H(I_{2,V}))$$

Thus, it should be appreciated that the gradient from the HSV feature space and the diffusion distance between histograms of the HSV feature space are perceptual metrics and, therefore, operate as perceptual similarity metrics. The present invention improves upon the prior art through its use of a perceptual similarity metric. A perceptual similarity metric is a quantitative value of similarity between a pair of images (e.g., range of 0-1, where a low value indicates not similar and a high value indicates very similar) based on using features that a human may employ when asked to qualitatively describe similarity between a pair of images (e.g., low, medium or high).

If there is only one similarity metric between the images in each image pair, then a net similarity metric is determined to be the same as the similarity metric as described above. Alternatively, and is often the case, more than one similarity metric exists between the images in each image pair. In such circumstances, a net similarity metric is then generated (as described below) by combining the similarity metrics.

In doing so, the perceptual similarity metrics are first weighted (depicted as element 316 in FIG. 3) according to predetermined weights to generate weighted perceptual similarity metrics. As a non-limiting example, the perceptual similarity metrics are weighted according to equal weighting (e.g., value of 1 divided by the number of individual metrics being used). For example, in the equation K(I1, I2)=..., there are five individual metrics and hence all the weights $W_G$, $W_{HT}$, $W_H$, $W_S$, and $W_V$ are 1/5=0.2, corresponding to $K_G$, $K_{HT}$, $K_H$, $K_S$, and $K_V$.

The net similarity metric (depicted as element 304 in FIG. 3) between images $I_1$ and $I_2$ is a weighted combination (depicted as element 318 of FIG. 3) of the above weighted perceptual similarity metrics, as given below:

$$K(I_1, I_2) = \sum_{i=G,HT,H,S,V} W_i K_i = W_G K_G + W_{HT} K_{HT} + W_H K_H + W_S K_S + W_V K_V$$

This is the weighted sum of the channels over the color space.

It should be noted that the weighted sum can be extended for arbitrarily weighted image metrics for ordering. It should also be noted that through normalizing the data, a metric distance measure is achieved, in other words, the metric satisfies the triangle inequality. Further, the net similarity metric can be formed by combining the weights through a variety of techniques, non-limiting examples of which include addition (as outlined above), multiplication, etc.

Thus, the above similarity metric is computed for all pairs of images in the RSVP image set. For N images, there are $N_{C_2}$ distinct image pairs and the above K-metric is computed for each of those pairs.

(3.3) Image Ordering

The problem of ordering the images according to their distances from one another reduces to the same problem as the Traveling Salesman Problem (TSP), as mentioned above. The TSP works on a graph G=(V, E), where V is a set of vertices (often cities, locations), and E is a set of edges between the vertices. Each $e \in E$ has a weight $w_i$. The goal of the TSP is to find a tour of edges $T \subset E$ such that all vertices are visited only once and $$\sum_{i \in T} w_i$$

is minimized. Ordering a set of n images consists of solving TSP on $K_n$, completing a graph with n vertices, with the weights $w_i$ being the distances between the endpoints of the edge $w_i$.

Content-based image retrieval (CBIR) systems routinely use multidimensional scaling (MDS) and hierarchical clustering for the visualization of both stored and retrieved images. Various structures have been developed based on Euclidean distance metrics such as the k-d trees, the R-d trees and their variants. Since a goal of the present invention is to rapidly order images for presentation, and TSP is known to be NP-Complete, an approximation can be used to solve the TSP problem as is applicable to the image ordering problem. Another reason for selecting an approximation over the exact answer is that the images are presented to the user and need to be ordered from a user perspective; thus, it cannot be guaranteed that the optimal mathematical ordering is the most visually appealing. Based on previous experimental results, the ordering provides a good starting point from which the user can improve through a few trials. The algorithm used to approximate the TSP is described below and guarantees:

$$\sum_{i \in T} w_i \leq 2OPT,$$

where OPT is the optimal value, as described by Vazirani, V. in *Approximation Algorithms*. Springer-Verlag, Berlin, Germany. p 32 (2004), which is incorporated by reference as though fully set forth herein.

The process used is only valid for metric TSP, which will still work in the present system since the distance measure is a metric. The main steps in this process are:
 a. Construct Minimum Spanning Tree.
 b. Double every edge to form a Euler Graph.
 c. Build an Euler path in the minimum spanning tree.
 d. Repair the Euler path to be a Hamiltonian by walking along the path and skipping over all elements already visited.

It should be understood that finding a Minimum Spanning Tree, a subset of edges in a weighted graph that preserve connectivity of vertices, results in a tree with minimum possible edge weight cost. The edge weight cost is computed as the sum of the weights on edges in a graph. These edges can be doubled by adding a second edge between connected vertices u and v to form a Euler Graph. A Euler Graph is the same as the Minimum Spanning tree, except for there being two edges between any pair of previously connected vertices. Thereafter, a Euler path, a path which each edge is crossed only once, can be built by picking any starting vertex and traveling through all edges until you return to the starting vertex. The Euler path can then be repaired by removing edges to be a Hamiltonian path. For example, if a same node is visited twice in a path it is deleted from the path. A Hamiltonian path is a path that passes through each vertex only once. Thus, by walking along the path and skipping over all elements already visited, there is only one way to get to and from a vertex, a Hamiltonian Path. Such a process was described by Vazirani, V. in *Approximation Algorithms*. Springer-Verlag, Berlin, Germany. p 32 (2004).

The results of the above image ordering algorithm is a computer-ordered set of images denoted by $O_A$. Thus, the images are ordered according to the net similarity metrics, such that images that are most similar are ordered next to one another, or, alternatively, such that images that are most dissimilar are ordered next to one another.

This computer-ordered set of images ($O_A$) is presented to the user for visual inspection and potential re-ordering. As a non-limiting example, the user can click and drag any image to move the image to a different position in the order, thereby generating a user-ordered set of images.

(3.4) User-Image Ordering

The system is configured to allow the user to adjust the image order based on his/her subjective assessment. Thus, the system presents the images to the user using any suitably interactive system. As a non-limiting example, the images are presented to the user on a GUI display that allows the user to select (with a pointer) and re-order the images by dragging the images to the desired location, thereby generating a user-ordered set of images.

Figure 15:
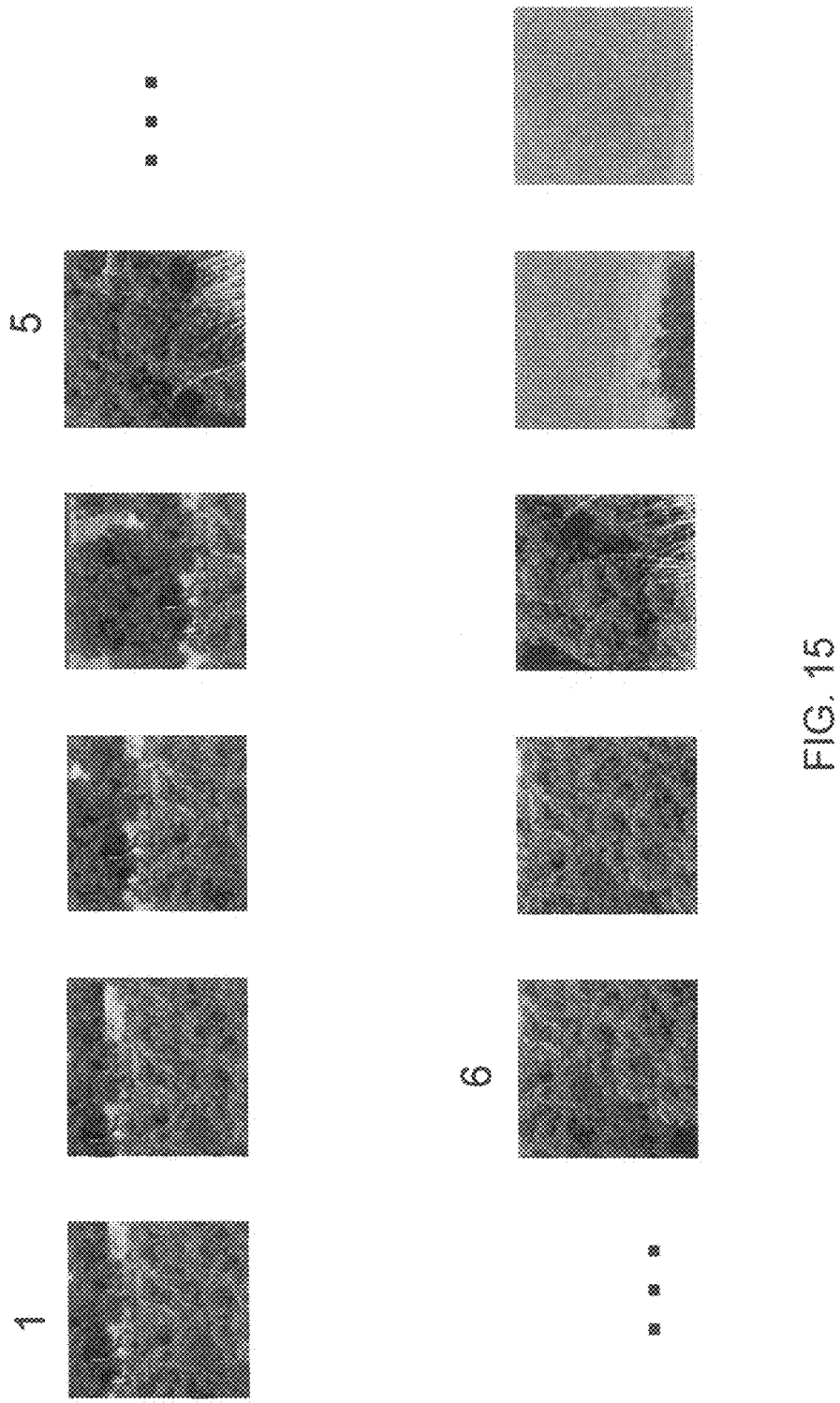
FIG. 15 depicts the ordering of the images based on M4 and the ordering method described herein.
Figure 16:
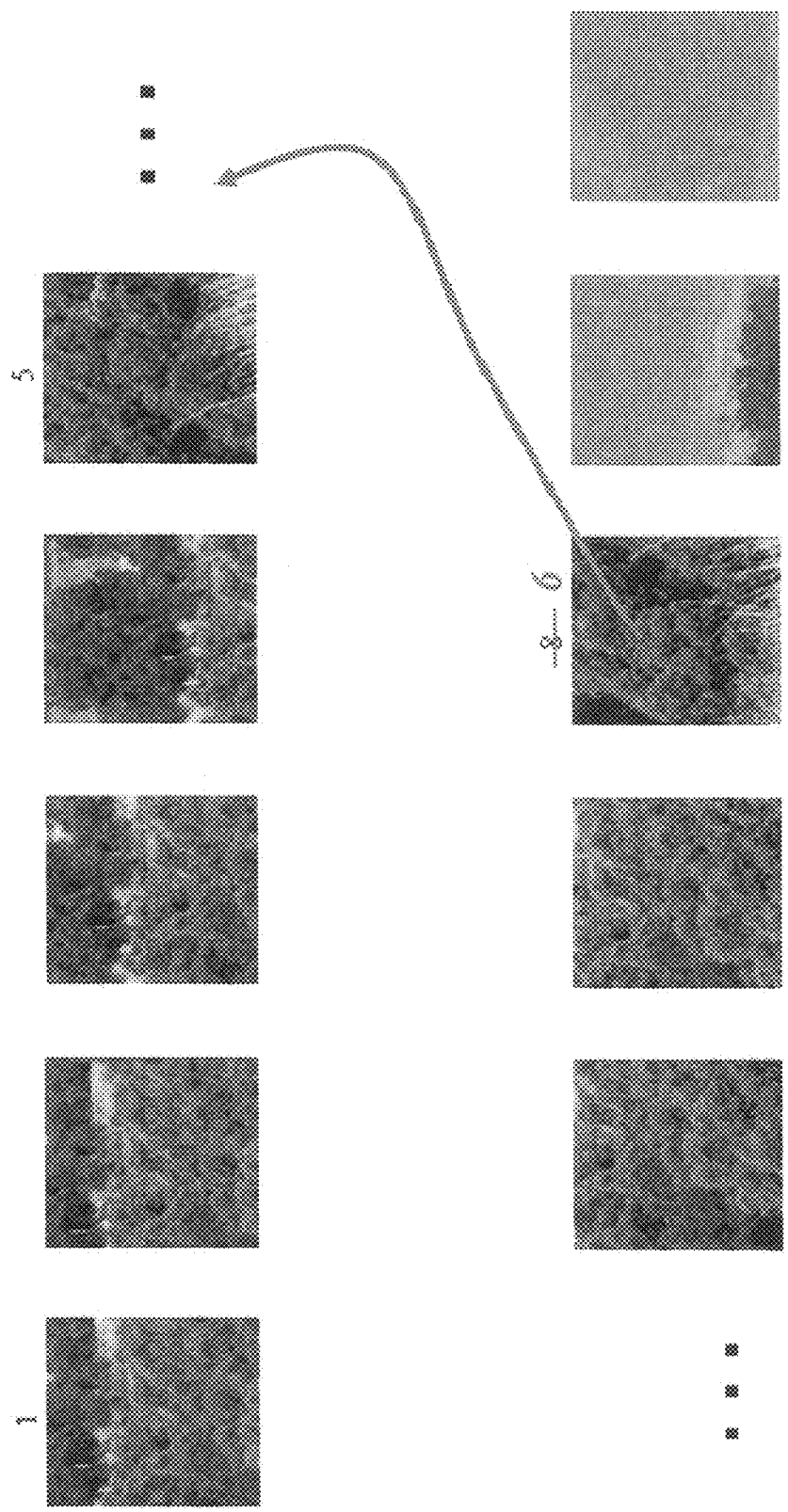
FIG. 16 depicts a user-based reordering, where Image No. 8 is reordered to be adjacent to Image No. 5.

In experiments, it has been found that the algorithm generated image order $O_A$ (i.e., computer-ordered set of images) is good and typically results in only a few images that are perceived as out of order by the user; thus, minor re-ordering is needed. Examples of computer-ordered and user-ordered sets of images are shown in FIGS. 15 and 16, respectively. As can be seen, in this example, the user only chose to reorder a few images in the computer-ordered set of images. The optimal user interface for presentation of the images to the user is not a subject of this invention. However, as a non-limiting example, ~N=50 images can be presented as several rows consisting of ~10 images/row. Such a configuration was found to be visually easy to inspect by the user. The final user re-ordered image set is denoted as $O_U$.

(3.5) Optimization

Based on the computer-ordered and user-ordered image sets, the next step is to optimize the metric weights ($W_i$) to generate optimized weights such that the difference between the computer-ordered and use-ordered image sets is minimized. A goal of the optimization step is to learn the weighting of the similarity metrics such that the system learns to order the image set similar to how the user would order it. In prior art for CBIR applications, the image similarity is modeled in terms of calculable image features. In other words, the user assesses image similarity and user feedback is used to compute image features. However, the image feature space is highly multi-dimensional, complex and large; thus, finding the optimized image feature space to use is a non-tractable problem. In addition, the present invention does not just assess image similarities, but also orders images as perceptually appealing to the user for RSVP purposes. Thus, instead of using the fixed subset of image features known to contribute to human judgment of image similarity (described in Steps 1 and 2 (i.e., extracting image features and computing the distance metrics)), the present invention optimizes how to combine or weight these features.

The objective function value for the optimization step is the L1-norm of image position difference between the algorithm and user-image orders. The objective function is minimized by optimizing the weights $W_i$, as described below:

Step 1: Compute image similarity metrics $K_G$, $K_{HT}$, $K_H$, $K_S$, $K_V$ between every pair of images ($I_1$, $I_2$), as described in Section 3.2

Step 2:

$$K(I_1, I_2) = \sum_{i=G,HT,H,S,V} W_i K_i = W_G K_G + W_{HT} K_{HT} + W_H K_H + W_S K_S + W_V K_V$$

Step 3: Algorithm Image Order $O_A$

Step 4: User Image Order $O_U$ $$\text{Minimize } D(O_A, O_U) = \sum_{j=1}^{N} |P_A(j) - P_U(j)| = \text{function}(W_i)$$

where P(j) is the position of the jth image in the ordered set and D(.) is the L1-norm of the position difference in images between the algorithm and user generated orders. In this non-limiting example, a publicly available Matlab Optimization toolbox was used to implement this optimization step.

Once the optimal metric weights $W_i$ have been computed, the system then uses these optimal weights in the metric equation (i.e., as described in step 2, equation $K(I_1,I_2)=$ . . . above) to give optimal image similarity metrics. The system then proceeds with the image ordering algorithm (as described in Section 3.3 above) to create the computer generated image order. The computer generated image order becomes the image order for RSVP presentations.

The system then can proceed to improve the ordering by repeating the procedure until the distance (between the computer-ordered set of images and the user-ordered set of images) is less than a predetermined threshold or receipt of an optimized ordering as indicated by a user The system could also learn to optimize the weights by using multiple RSVP image sets and minimize the L1-norm of algorithm and user image orders across all these sets. In another aspect, one could even combine these across multiple users since most users have a very similar preference for image orders, i.e., perceptual similarity translates well across users.

(4) EXAMPLE APPLICATION

Provided below is an example application of the present invention as reduced to practice. It should be understood that the example provided below is for illustrative purposes only as the invention is not intended to be limited thereto.

The following are results for image ordering by utilizing image similarity metrics, which were computed between all pairs of images i and j.

The metrics used were:
 a. $M1=K_{HT}=$L1 distance on the hue, saturation, and value (HSV) histograms from images i and j;
 b. $M2=K_G=$L1 distance on the gradients from rows and columns in images and j;
 c. $M3=K_H+K_S+K_V=$Diffusion distance on the HSV histograms from images i and j; and
 d. M4=W1*M1+W2*M2+W3*M3 (Note: this is a final metric that weights and sums the above three metrics).

It should be noted that fewer metrics were used in this example in order to reduce the number of weights used (i.e., three instead of five) to simplify the reduction to practice for rapid implementation.

Each metric (M1-M4) was normalized across all images in the set between [0,1]. Image ordering was based on M4 across all images in a set. Small distances between images reflect their high similarity, where 0 distance occurs for identical images. The weights W1, W2 and W3 were chosen as 0.2 each (see Step b in section (4.3) for details), such that $W1=W_{HT}$, $W2=W_G$, and $W3=W_H=W_S=W_V$.

Figure 4:
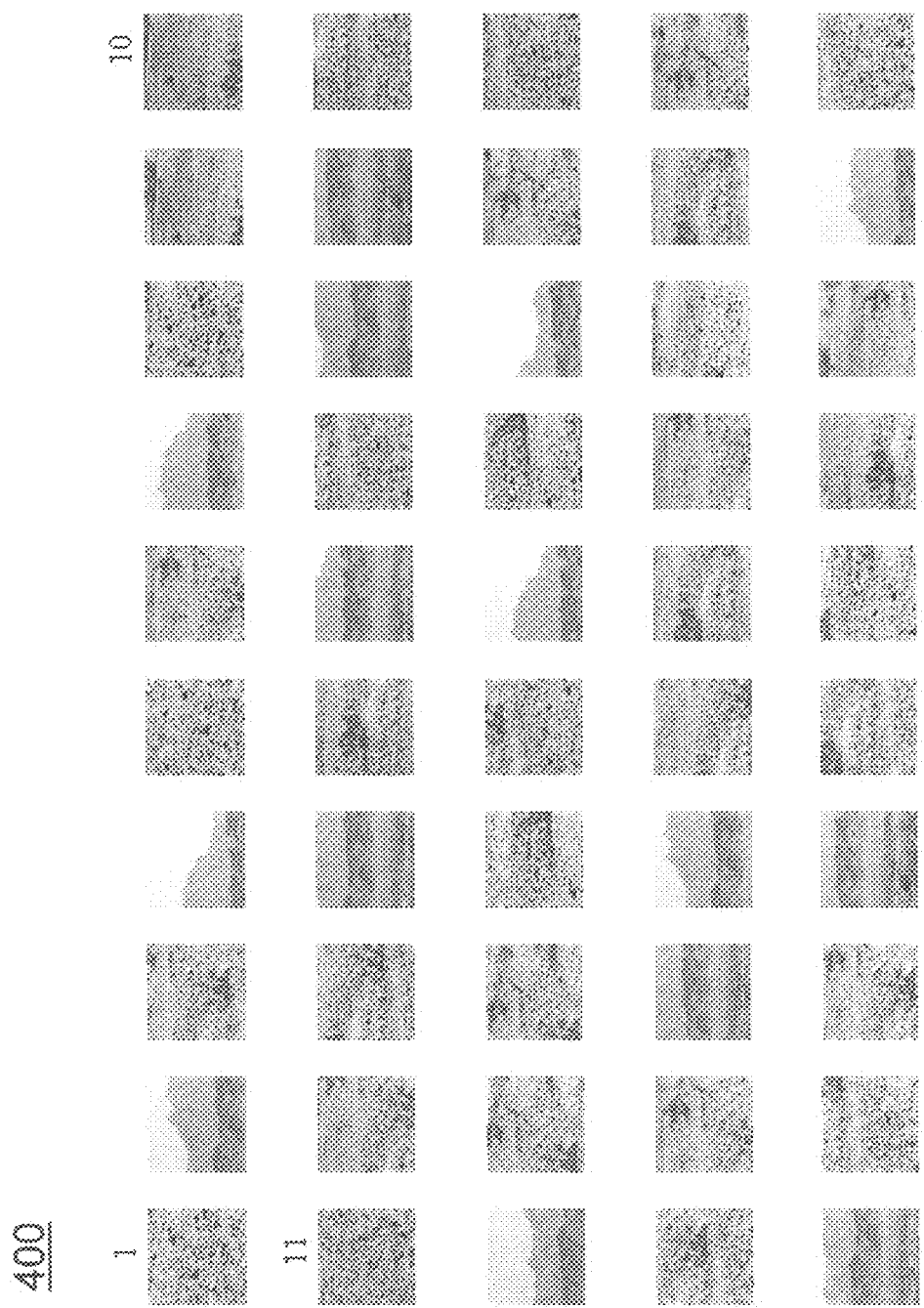
FIG. 4 is an illustration of a random ordering of images which is typically used in RSVP paradigms.

For comparison purposes, FIG. 4 is an illustration of a random ordering of images 400 which is typically used in RSVP paradigms. As clearly illustrated, images adjacent to one another do not reflect a high similarity. The images are labeled in rows from the left to right, as Image Number 1 through Image Number 10.

Figure 5:
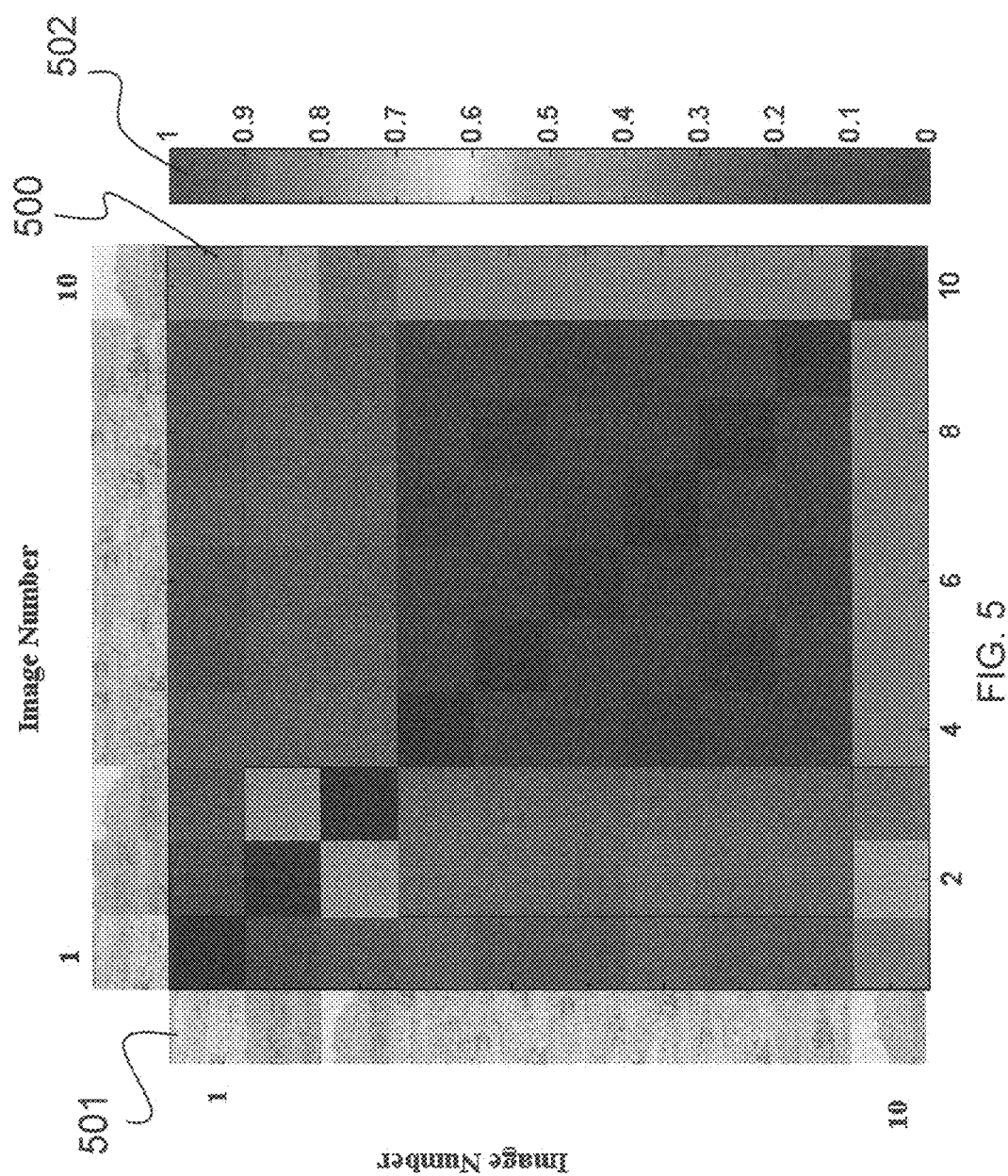
FIG. 5 is an illustration depicting Metric 1 (M1) for a subset of the images shown in FIG. 4.

FIG. 5 illustrates Metric 1 (M1) 500 for a subset of the images (dataset #1) 501 shown in FIG. 4. It should be understood that, as a non-limiting example, the FIG. 4 data was created by collecting one image from a large format digital camera (e.g., 16 Megapixel image, 4872×3248) and breaking this image into small sub-images (size 256×256) and, further, selecting 50 of these sub-images. FIG. 5 (as well as later FIGS. 6-8) shows 10 of these sub-images arbitrarily selected from the FIG. 4 dataset for purposes of showing the various image similarity metrics. The numbers 1 to 10 labeled over these images do not have any relation with the numbers shown over images in the FIG. 4 dataset.

A subset of images containing only desert soil (Image Nos. 1, and 4-9) is similar to the viewer. Hue, saturation, and value are an image representation that is correlated to human color metrics. FIG. 5 shows that images that are close in distance measured by M1 are generally subjectively close in color content.

More specifically, FIG. 5 illustrates a Metric 1 (M1) matrix 500 for a subset of images (n=10) 501 from FIG. 4. The colors plotted from the matrix represent one measure of distance between images in the set (M1). M1 is the sum of the L1 distances between the HSV histograms for each pair of images. The distances for each pair of images are then normalized between [0,1] across all image pairs, as shown in the color bar 502. The diagonal of the matrix (and all matrix plots in the remaining figures) are 0 for all the metrics used.

Figure 6:
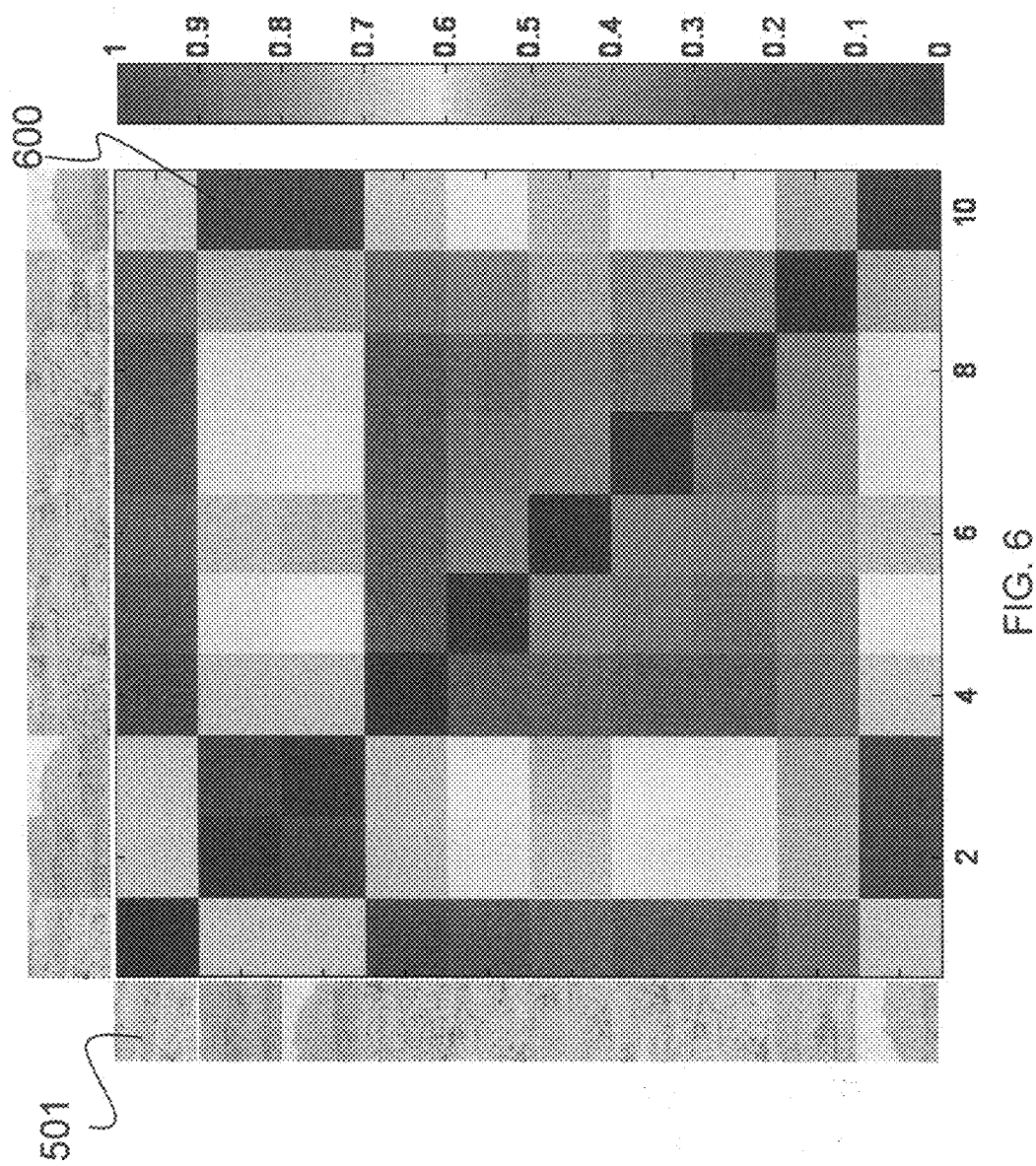
FIG. 6 is an illustration depicting Metric 2 (M2) for the same subset of images as used in FIG. 5.

FIG. 6 shows Metric 2 (M2) 600 for the same image set 501 that is used in FIG. 5. In this case, the gradient is taken for the HSV values for each image i and j, which measures the spatial difference in HSV values across pixels in 2 dimensions (rows and columns) in each image. The difference in gradient values for H, S, and V is taken between the 2 images. These differences are summed, normalized across all image pairs to [0,1], as shown in FIG. 6. This metric is one measure of spatial relationships in the images, and is useful in encapsulating similarity due to viewing distance in images. Images with a close viewing distance often have high frequency changes in spatial content (such as ground textures), which can be measured with a variety of methods (such as Fourier transforms, etc.). The gradient (M2) is also sensitive to spatial frequency, and provides a measure of similarity that is useful in this method. For example, Images rich in high spatial frequencies have gradients that change rapidly across the image, and are dissimilar between images (Images Nos. 1, 4-9). Alternatively, images with large viewing distances and less high spatial frequency content have similar distributions of gradient information across each image, and hence smaller gradient distances between images (Images Nos. 2, 3, and 10).

Figure 7:
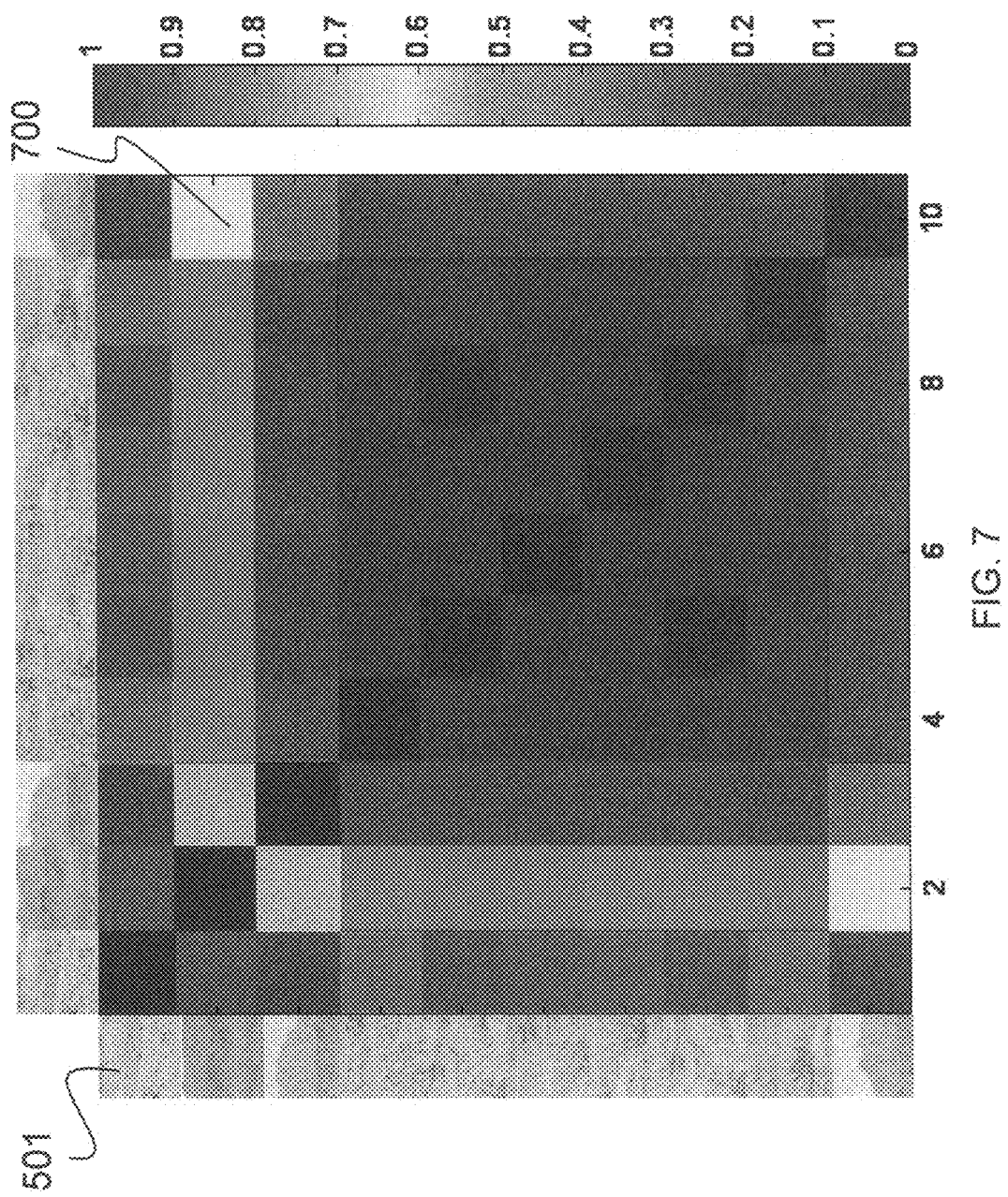
FIG. 7 is an illustration depicting Metric 3 (M3) for the same subset of images as used in FIG. 5.

FIG. 7 shows Metric 3 (M3) 700 for the same set of images 501 as used and depicted in FIG. 5 The diffusion distance is taken between the HSV histograms between each pair of images i and j, summed across the distances for each histogram, and normalized across all image pairs.

Figure 8:
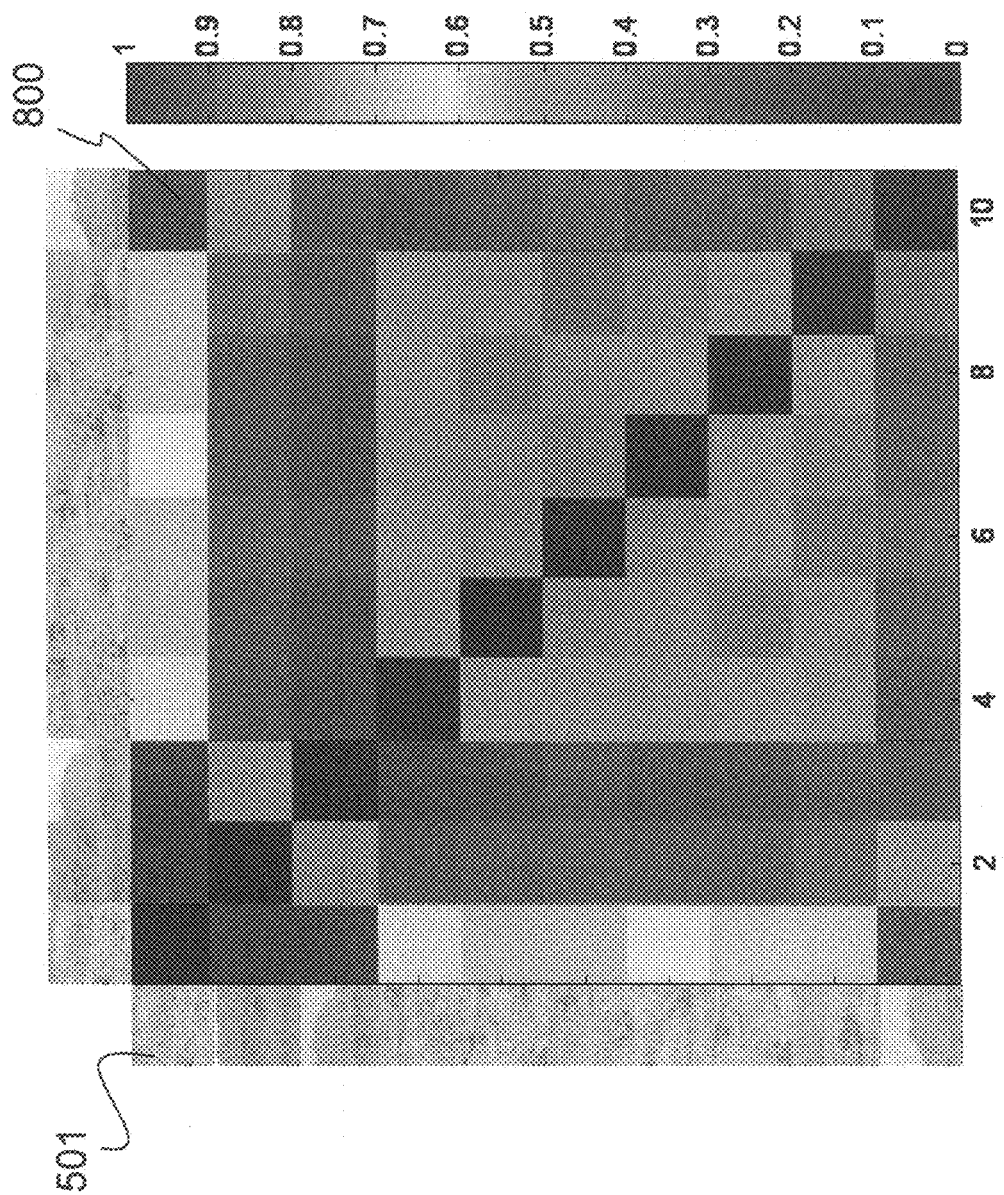
FIG. 8 is an illustration depicting Metric 4 (M4) for the same subset of images as used in FIG. 5.

FIG. 8 shows Metric 4 (M4) 800 for the same set of images 501 as used and depicted in FIG. 5. In this case, M4 is the fusion of M1, M2, and M3, a linearly weighted sum of the metrics. Thus, M1-M3 are weighted, and summed for each pair of images. The weights at this stage of the process are the same and sum to 1; however, the weights are adjustable by an optimization stage described later. This quantity (M4) is then normalized across all pairs of images, as is shown in FIG. 8. Note the small distances/similarity (blue/green) between Images Nos. 1, 4-9 which show ground texture in the desert, as well as the similarity between Images Nos. 2, 3, and 10, which show the mountains and sky at a large viewing distance.

Figure 9:
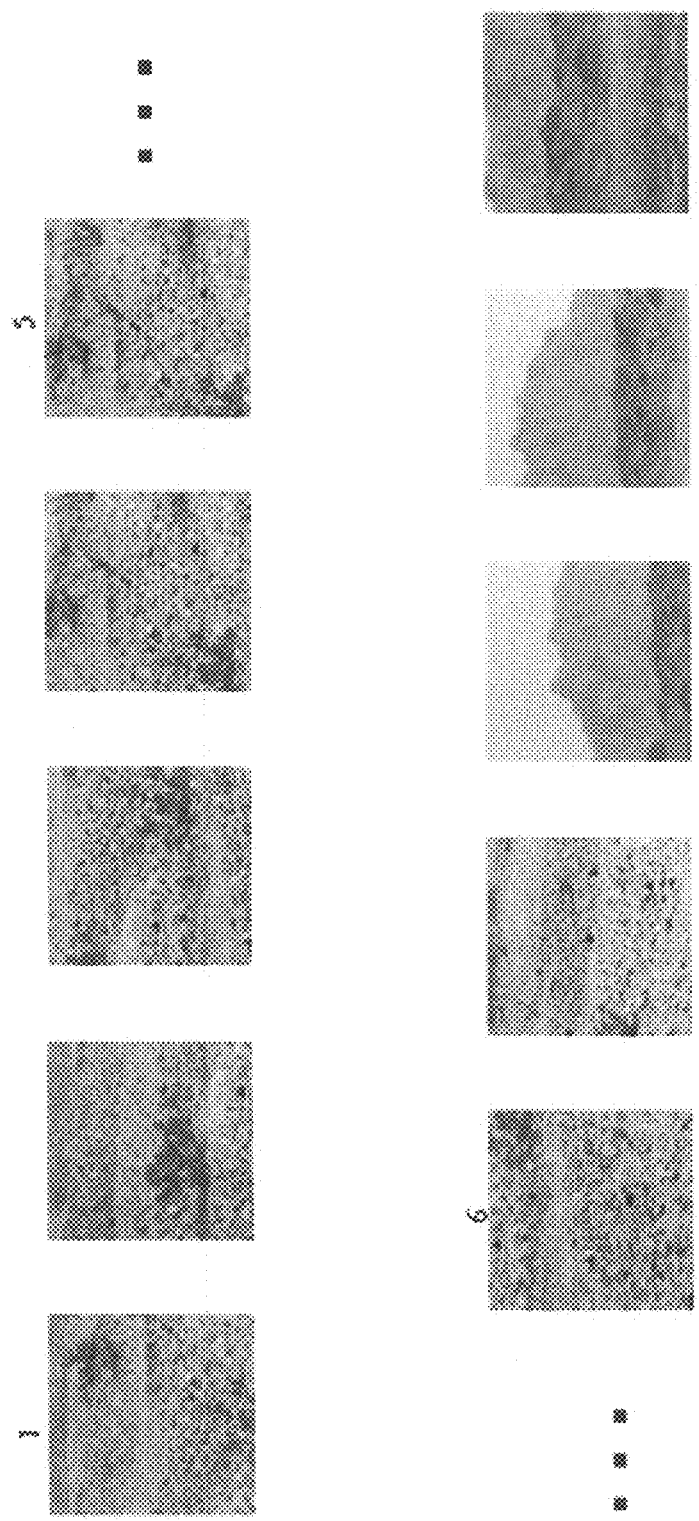
FIG. 9 depicts the ordering of the images based on M4 and the ordering method described herein.

Based on the normalization of M4, the system orders the images according to their similarity. FIG. 9 depicts the ordering of the images based on M4 and the ordering method described above. Thus, as can be seen in FIG. 9, similar images are grouped together.

For further understanding, FIGS. 10 through 15 illustrate the process being repeated on another sample of images (i.e., dataset #2) used in an RSVP sequence. FIGS. 11 through 15 show the same metrics (M1-M4) and image ordering based on M4 for a subset of the images shown in FIG. 10.

Figure 10:
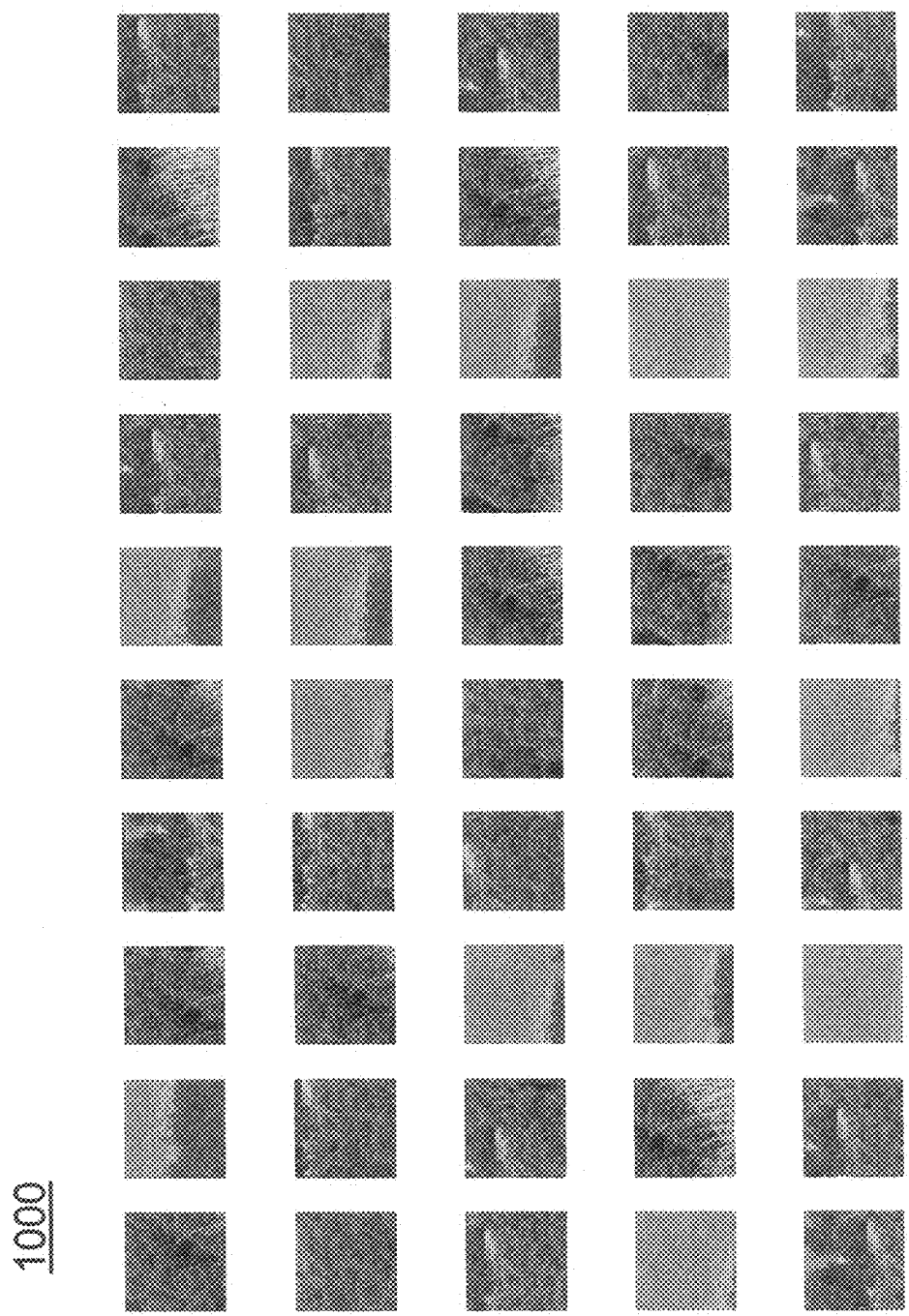
FIG. 10 depicts a random ordering of images for a typical RSVP session.

More specifically, FIG. 10 depicts a random ordering of images 1000 for a typical RSVP session.

Figure 11:
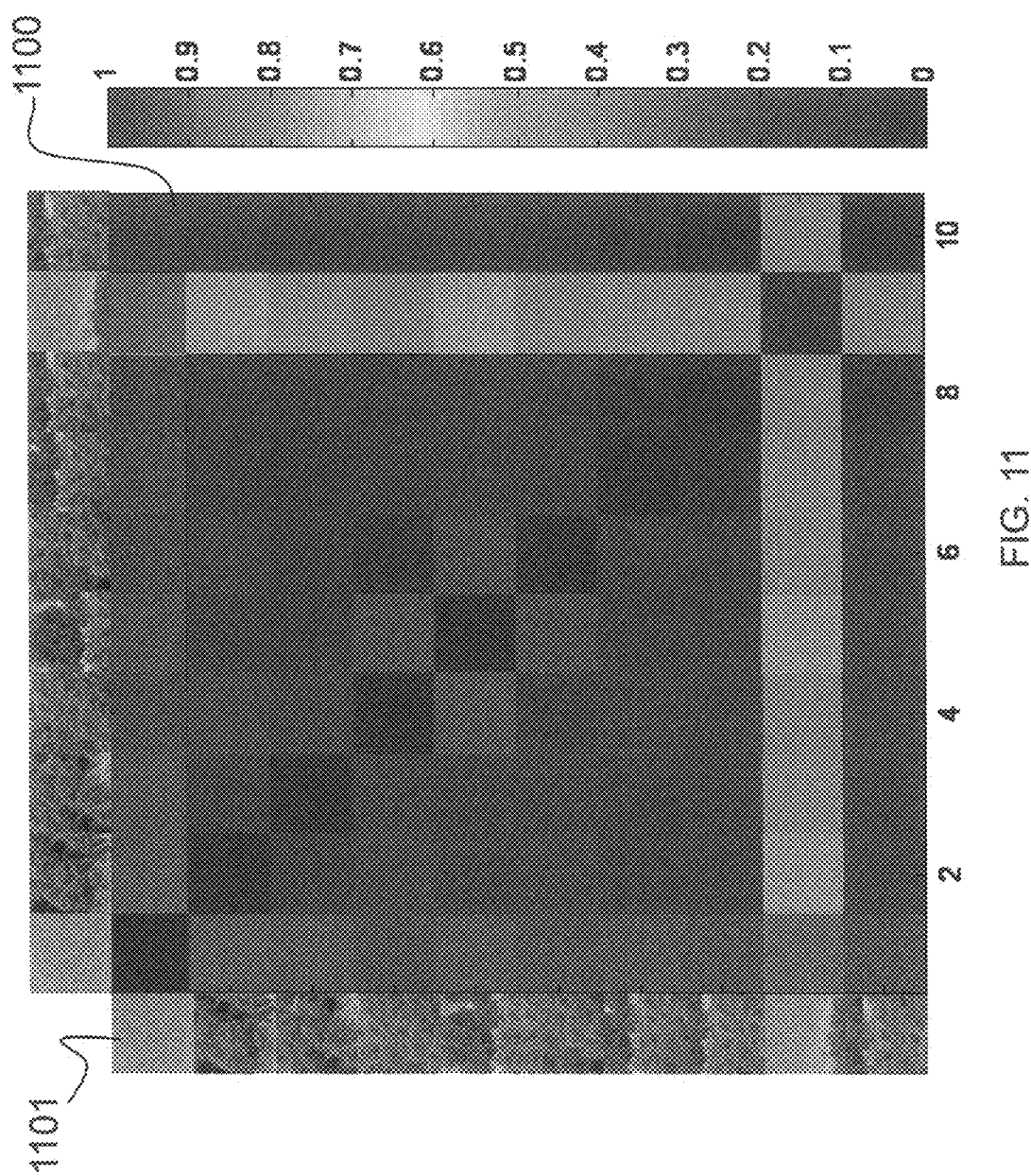
FIG. 11 is an illustration of Metric 1 (M1) for a subset of images from FIG. 10.

FIG. 11 is an illustration of Metric 1 (M1) 1100 for a subset of images 1101 from FIG. 10. Images of foliage (Image Nos. 2-8, 10) with similar hue content are close in M1 distance.

Figure 12:
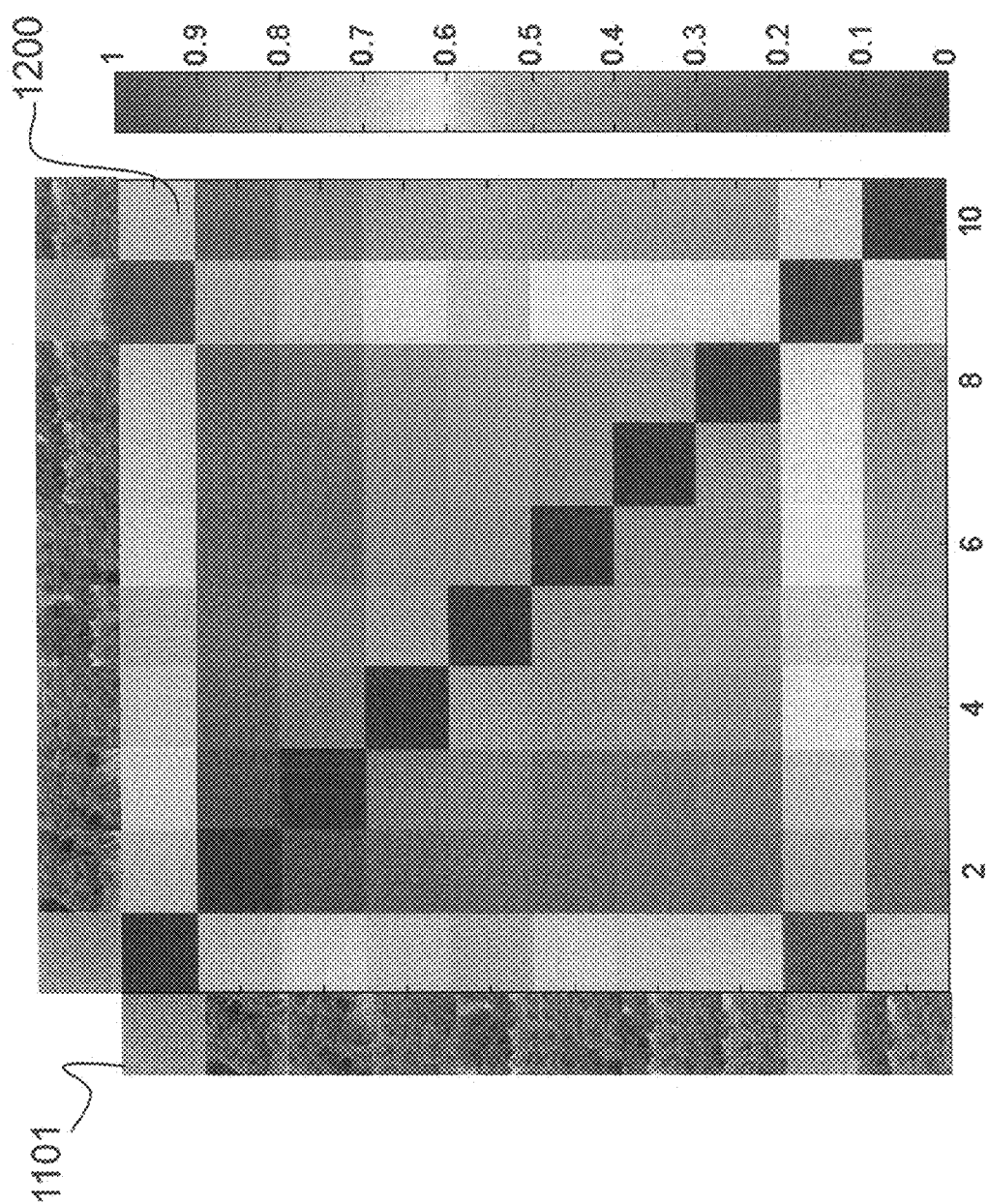
FIG. 12 is an illustration depicting Metric 2 (M2) for the same subset of images as used in FIG. 11.

FIG. 12 is an illustration of Metric 2 (M2) 1200 for the same subset of images 1101. Images of foliage (Images Nos. 2-8, 10) with high spatial frequency content have dissimilar gradients, while Image Nos. 1 and 9 with large viewing distances have similar gradients.

Figure 13:
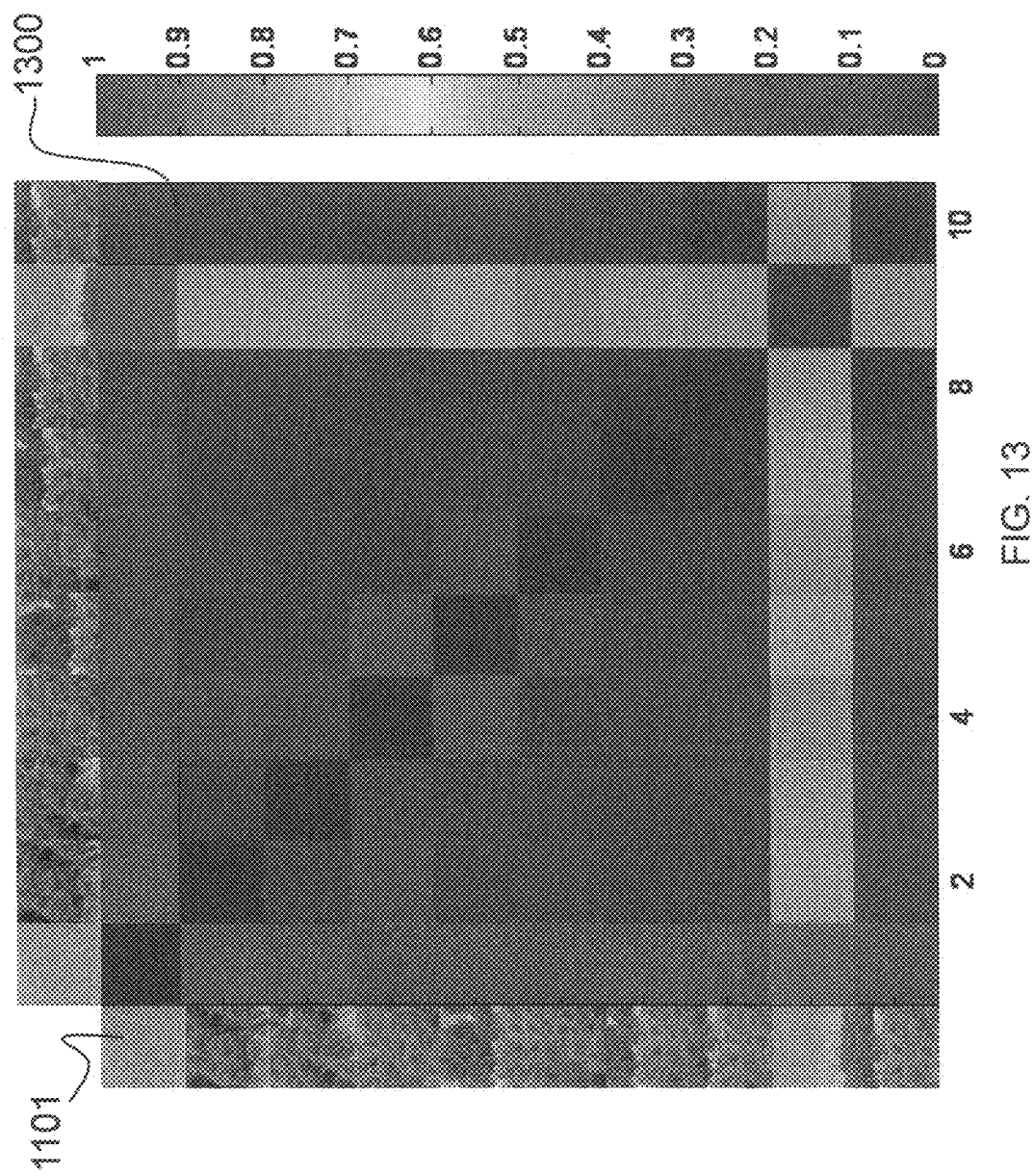
FIG. 13 is an illustration depicting Metric 3 (M3) for the same subset of images as used in FIG. 11.

FIG. 13 is an illustration of Metric 3 (M3) 1300 for the same subset of images 1101. As depicted images of foliage (Images Nos. 2-8, 10) are similar as measured by diffusion distance, and dissimilar compared to images with large viewing distances (Images Nos. 1, 9).

Figure 14:
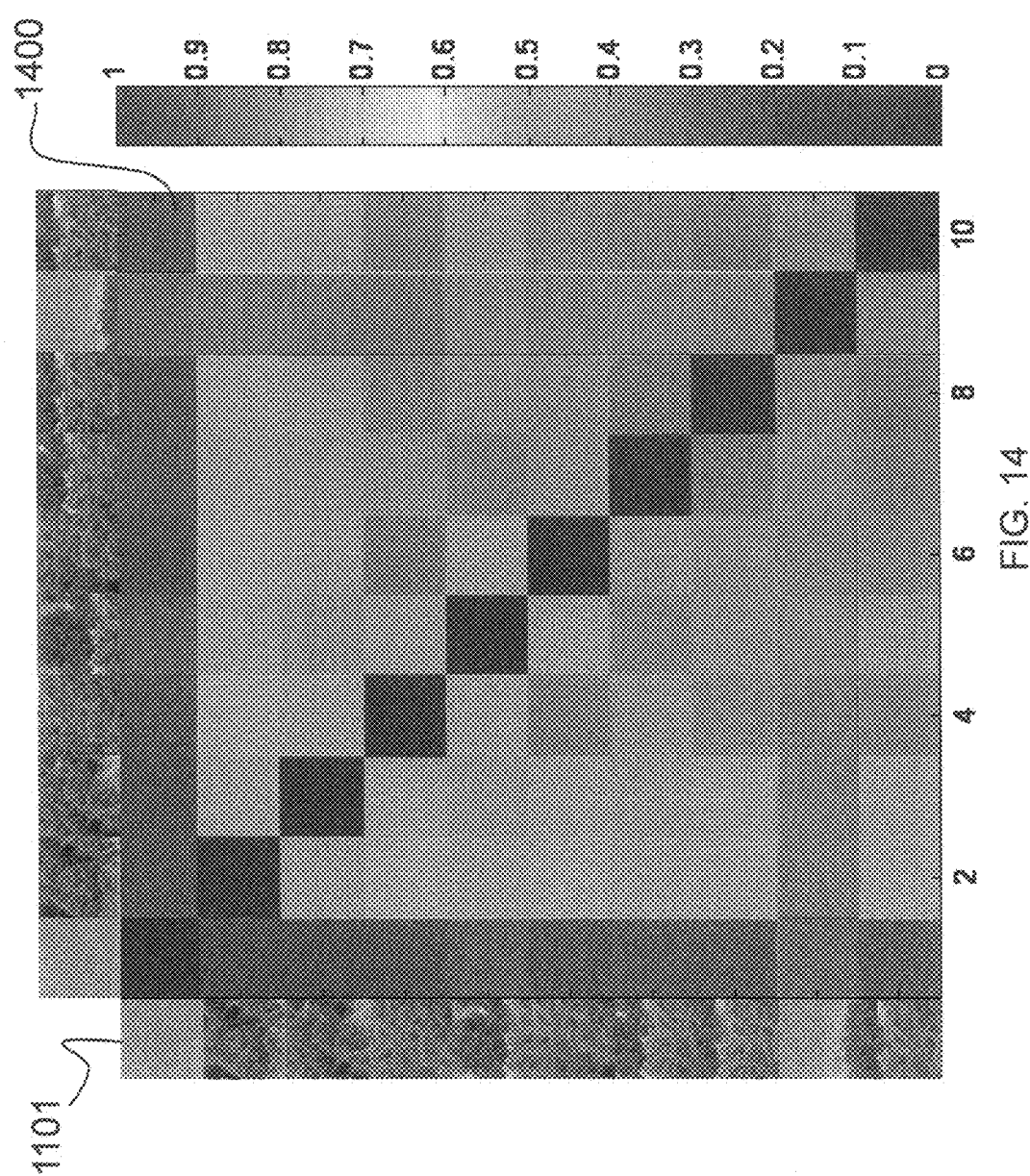
FIG. 14 is an illustration depicting Metric 4 (M4) for the same subset of images as used in FIG. 11.

As was the case above with respect to M4, FIG. 14 is an illustration of Metric 4 (M4) 1400, which is a fusion of Metrics 1-3 for the image subset 1101. Again, similar images have a small M4 distance.

As depicted in FIG. 15, based on the normalization of M4, the system orders the images according to their similarity. Thus, as can be seen in FIG. 15, similar images are grouped together.

As noted above, the present invention also provides for a user interface to allow a user to reorder the images after an initial reordering by the system. Thus, FIG. 16 depicts a user-based reordering, where Image No. 8 is reordered to be adjacent to Image No. 5, thereby becoming Image No. 6.

Figure 17:
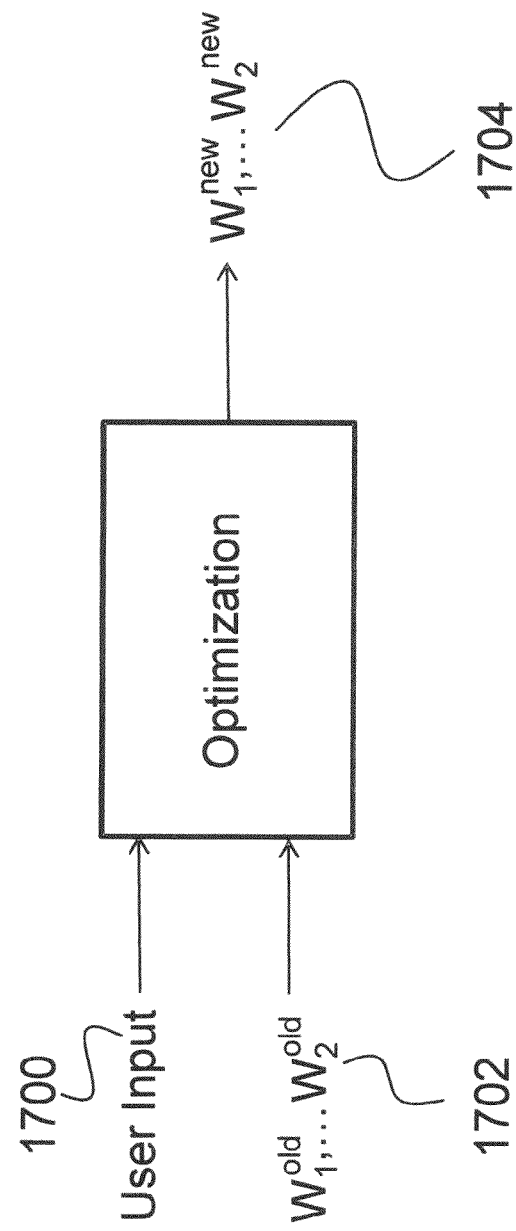
FIG. 17 is an illustration of a flow chart, depicting the process by which user input can be used to optimize the metric weights.

As shown in FIG. 17, such reordering produces new distances between images that serve as an input to the optimization process to compute new weights on Metrics 1 through 3 for the fusion Metric 4. Thus, with the user's input 1700 in reordering the images, the old weights 1702 are optimized to compute new weights 1704. As such, using the present invention, the system continually optimizes the reordering of images.

What is claimed is:

1. A computer implemented method for ordering images, comprising an act of causing a computer having a processor to perform operations of
   i. receiving, in the processor, a plurality of images;
   ii. extracting, from each image, image features;
   iii. generating a set of all possible image pairs for all images;
   iv. generating at least one similarity metric between the images in each image pair in the set;
      1. if more than one similarity metric exists between the images in each image pair in the set, then generating a net similarity metric by combining the similarity metrics;
      2. if only one similarity metric exists between the images in each image pair in the set, then a net similarity metric is the similarity metric; and
   v. ordering the plurality of images according to the net similarity metrics to generate a computer-ordered set of images.

2. The method as set forth in claim 1, wherein in generating at least one similarity metric, the similarity metric is a perceptual similarity metric, and further comprising an act of selecting the perceptual similarity metric from a group consisting of a gradient of an HSV feature space and a diffusion distance between histograms of HSV feature space.

3. The method as set forth in claim 2, wherein the act of generating a net similarity metric further comprises acts of:
   i. weighting the perceptual similarity metrics according to predetermined weights to generate weighted perceptual similarity metrics; and
   ii. summing the weighted perceptual similarity metrics into the net similarity metric.

4. The method as set forth in claim 3, further comprising an act of receiving user input to the computer-ordered set of images to generate a user-ordered set of images.

5. The method as set forth in claim 4, further comprising an act of optimizing the weights to generate optimized weights such that the distance between the computer-ordered set of images and the user-ordered set of images is minimized.

6. The method as set forth in claim 5, further comprising acts of:
   i. weighting the perceptual similarity metrics according to optimized weights to generate re-weighted perceptual similarity metrics; and
   ii. summing the re-weighted perceptual similarity metrics into a new net similarity metric;
   iii. ordering the plurality of images according to the new net similarity metrics to generate a computer-ordered set of images; and
   iv. displaying the computer-ordered set of images to a user;
   v. receiving user input to the computer-ordered set of images to generate a user-ordered set of images;
   vi. optimizing the weights to generate optimized weights such that the distance between the computer-ordered set of images and the user-ordered set of images is minimized; and
   vii. repeating the acts of (i) through (vi) until the distance is less than a predetermined threshold or receipt of an optimized ordering as indicated by a user.

7. The method as set forth in claim 6, further comprising acts of
   i. receiving, in the processor, a second plurality of images;
   ii. extracting, from each image, image features;
   iii. generating a set of all possible image pairs for all images;
   iv. generating at least one similarity metric between the images in each image pair in the set;
      1. if more than one similarity metric exists between the images in each image pair in the set, then generating a net similarity metric by combining the similarity metrics;
      2. if only one similarity metric exists between the images in each image pair in the set, then a net similarity metric is the similarity metric; and
   v. ordering the second plurality of images according to the net similarity metrics to generate a computer-ordered set of images.

8. The method as set forth in claim 7, wherein in ordering the plurality of images according to the net similarity metrics, the images are ordered such that images that are most similar are ordered next to one another.

9. The method as set forth in claim 7, wherein in ordering the plurality of images according to the net similarity metrics, the images are ordered such that images that are most dissimilar are ordered next to one another.

10. A system for ordering images, comprising a processor configured to perform operations of:
   i. receiving, in the processor, a plurality of images;
   ii. extracting, from each image, image features;
   iii. generating a set of all possible image pairs for all images;
   iv. generating at least one similarity metric between the images in each image pair in the set;
      1. if more than one similarity metric exists between the images in each image pair in the set, then generating a net similarity metric by combining the similarity metrics;
      2. if only one similarity metric exists between the images in each image pair in the set, then a net similarity metric is the similarity metric; and v. ordering the plurality of images according to the net similarity metrics to generate a computer-ordered set of images.

11. The system as set forth in claim 10, wherein in generating at least one similarity metric, the similarity metric is a perceptual similarity metric, and the perceptual similarity metric is selected from a group consisting of a gradient from an HSV feature space and a diffusion distance between histograms of HSV feature space.

12. The system as set forth in claim 11, wherein in performing the operation of generating a net similarity metric, the processor is further configured to perform operations of
   i. weighting the perceptual similarity metrics according to predetermined weights to generate weighted perceptual similarity metrics; and
   ii. summing the weighted perceptual similarity metrics into the net similarity metric.

13. The system as set forth in claim 12, wherein the processor is further configured to perform an operation of receiving user input to the computer-ordered set of images to generate a user-ordered set of images.

14. The system as set forth in claim 13, wherein the processor is further configured to perform an operation of optimizing the weights to generate optimized weights such that the distance between the computer-ordered set of images and the user-ordered set of images is minimized.

15. The system as set forth in claim 14, wherein the processor is further configured to perform operations of:
   i. weighting the perceptual similarity metrics according to optimized weights to generate re-weighted perceptual similarity metrics; and
   ii. summing the re-weighted perceptual similarity metrics into a new net similarity metric;
   iii. ordering the plurality of images according to the new net similarity metrics to generate a computer-ordered set of images; and
   iv. displaying the computer-ordered set of images to a user;
   v. receiving user input to the computer-ordered set of images to generate a user-ordered set of images;
   vi. optimizing the weights to generate optimized weights such that the distance between the computer-ordered set of images and the user-ordered set of images is minimized; and
   vii. repeating the operations of (i) through (vi) until the distance is less than a predetermined threshold or receipt of an optimized ordering as indicated by a user.

16. The system as set forth in claim 15, wherein the processor is further configured to perform operations of:
   i. receiving, in the processor, a second plurality of images;
   ii. extracting, from each image, image features;
   iii. generating a set of all possible image pairs for all images;
   iv. generating at least one similarity metric between the images in each image pair in the set;
      1. if more than one similarity metric exists between the images in each image pair in the set, then generating a net similarity metric by combining the similarity metrics;
      2. if only one similarity metric exists between the images in each image pair in the set, then a net similarity metric is the similarity metric; and
   v. ordering the second plurality of images according to the net similarity metrics to generate a computer-ordered set of images.

17. A computer program product for ordering images, the computer program product comprising computer-readable instruction means stored on a non-transitory computer-readable medium that are executable by a computer having a processor for causing the processor to perform operations of:
   i. receiving, in the processor, a plurality of images;
   ii. extracting, from each image, image features;
   iii. generating a set of all possible image pairs for all images;
   iv. generating at least one similarity metric between the images in each image pair in the set;
      1. if more than one similarity metric exists between the images in each image pair in the set, then generating a net similarity metric by combining the similarity metrics;
      2. if only one similarity metric exists between the images in each image pair in the set, then a net similarity metric is the similarity metric; and
   v. ordering the plurality of images according to the net similarity metrics to generate a computer-ordered set of images.

18. The computer program product as set forth in claim 17, wherein in generating at least one similarity metric, the similarity metric is a perceptual similarity metric, and the perceptual similarity metric is selected from a group consisting of a gradient from an HSV feature space and a diffusion distance between histograms of HSV feature space.

19. The computer program product as set forth in claim 18, further comprising instruction means for causing the processor to perform operations of
   i. weighting the perceptual similarity metrics according to predetermined weights to generate weighted perceptual similarity metrics; and
   ii. summing the weighted perceptual similarity metrics into the net similarity metric.

20. The computer program product as set forth in claim 19, further comprising instruction means for causing the processor to perform an operation of receiving user input to the computer-ordered set of images to generate a user-ordered set of images.

21. The computer program product as set forth in claim 20, further comprising instruction means for causing the processor to perform an operation of optimizing the weights to generate optimized weights such that the distance between the computer-ordered set of images and the user-ordered set of images is minimized.

22. The computer program product as set forth in claim 21, further comprising instruction means for causing the processor to perform operations of
   i. weighting the perceptual similarity metrics according to optimized weights to generate re-weighted perceptual similarity metrics; and
   ii. summing the re-weighted perceptual similarity metrics into a new net similarity metric;
   iii. ordering the plurality of images according to the new net similarity metrics to generate a computer-ordered set of images; and
   iv. displaying the computer-ordered set of images to a user;
   v. receiving user input to the computer-ordered set of images to generate a user-ordered set of images;

vi. optimizing the weights to generate optimized weights such that the distance between the computer-ordered set of images and the user-ordered set of images is minimized; and vii. repeating the operations of (i) through (vi) until the distance is less than a predetermined threshold or receipt of an optimized ordering as indicated by a user.

23. The computer program product as set forth in claim 22, further comprising instruction means for causing the processor to perform operations of i. receiving, in the processor, a second plurality of images;

ii. extracting, from each image, image features;

iii. generating a set of all possible image pairs for all images;

iv. generating at least one similarity metric between the images in each image pair in the set;

1. if more than one similarity metric exists between the images in each image pair in the set, then generating a net similarity metric by combining the similarity metrics;

2. if only one similarity metric exists between the images in each image pair in the set, then a net similarity metric is the similarity metric; and v. ordering the second plurality of images according to the net similarity metrics to generate a computer-ordered set of images.

* * * * *